April 25, 1944.  P. E. GELDHOF ET AL  2,347,190
AUTOMATIC WASHER
Filed Dec. 2, 1940  14 Sheets-Sheet 1
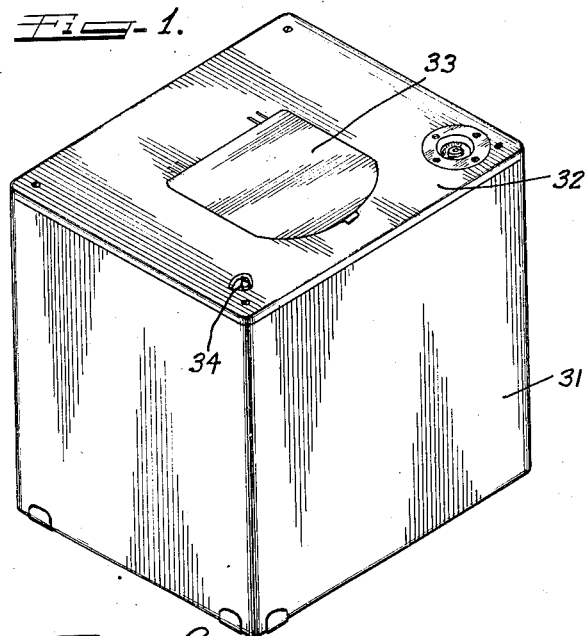
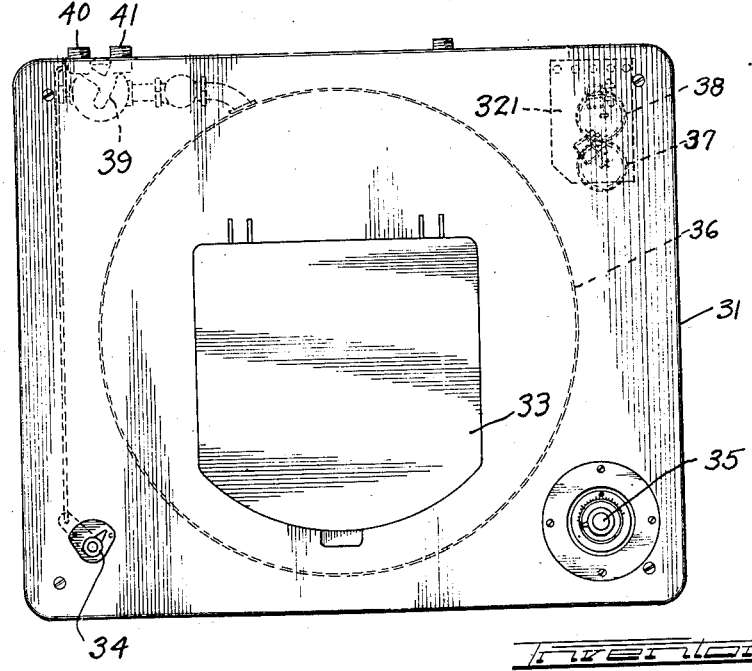
Inventors
PETER EDUARD GELDHOF.
LUTHER RINGER.
by Charles Hill Attys.

April 25, 1944. P. E. GELDHOF ET AL 2,347,190
AUTOMATIC WASHER
Filed Dec. 2, 1940 14 Sheets-Sheet 2

INVENTORS
PETER EDUARD GELDHOF
LUTHER RINGER.
BY Charles Biller ATTYS.

April 25, 1944.  P. E. GELDHOF ET AL  2,347,190
AUTOMATIC WASHER
Filed Dec. 2, 1940   14 Sheets-Sheet 3
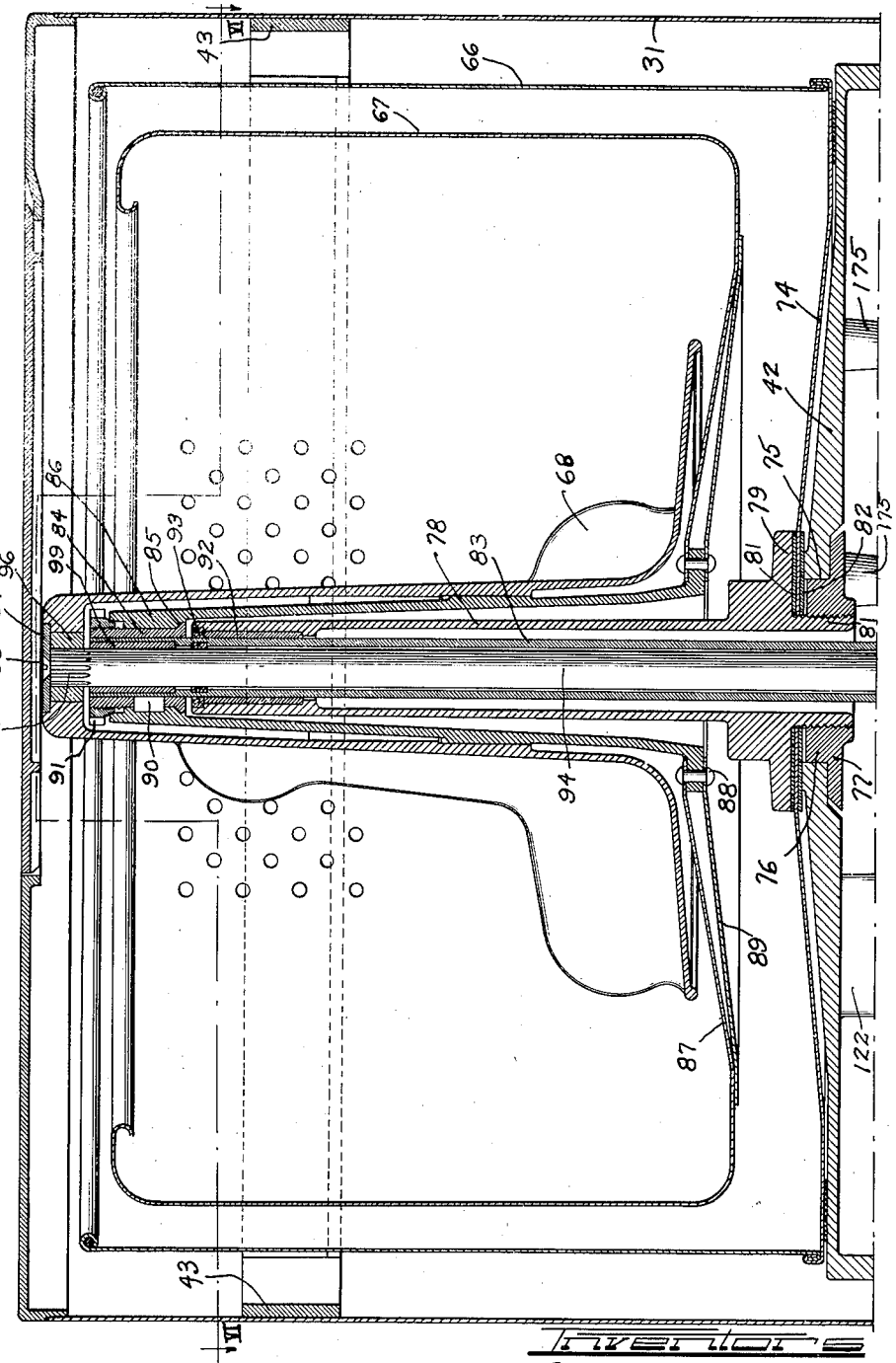
Inventors
PETER EDUARD GELDHOF.
LUTHER RINGER.
by Charles Ricks Attys.

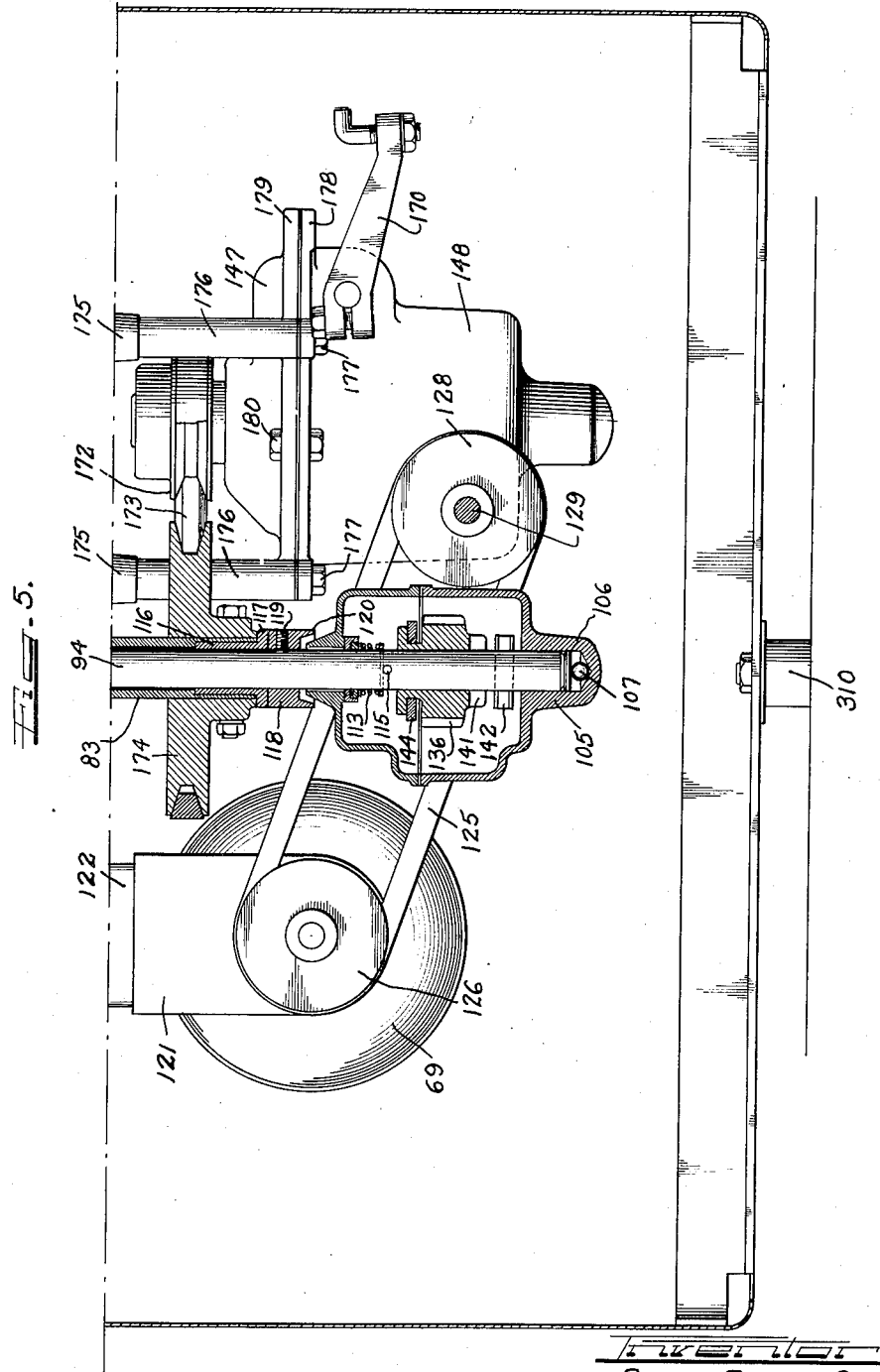

April 25, 1944.  P. E. GELDHOF ET AL  2,347,190
AUTOMATIC WASHER
Filed Dec. 2, 1940    14 Sheets-Sheet 5
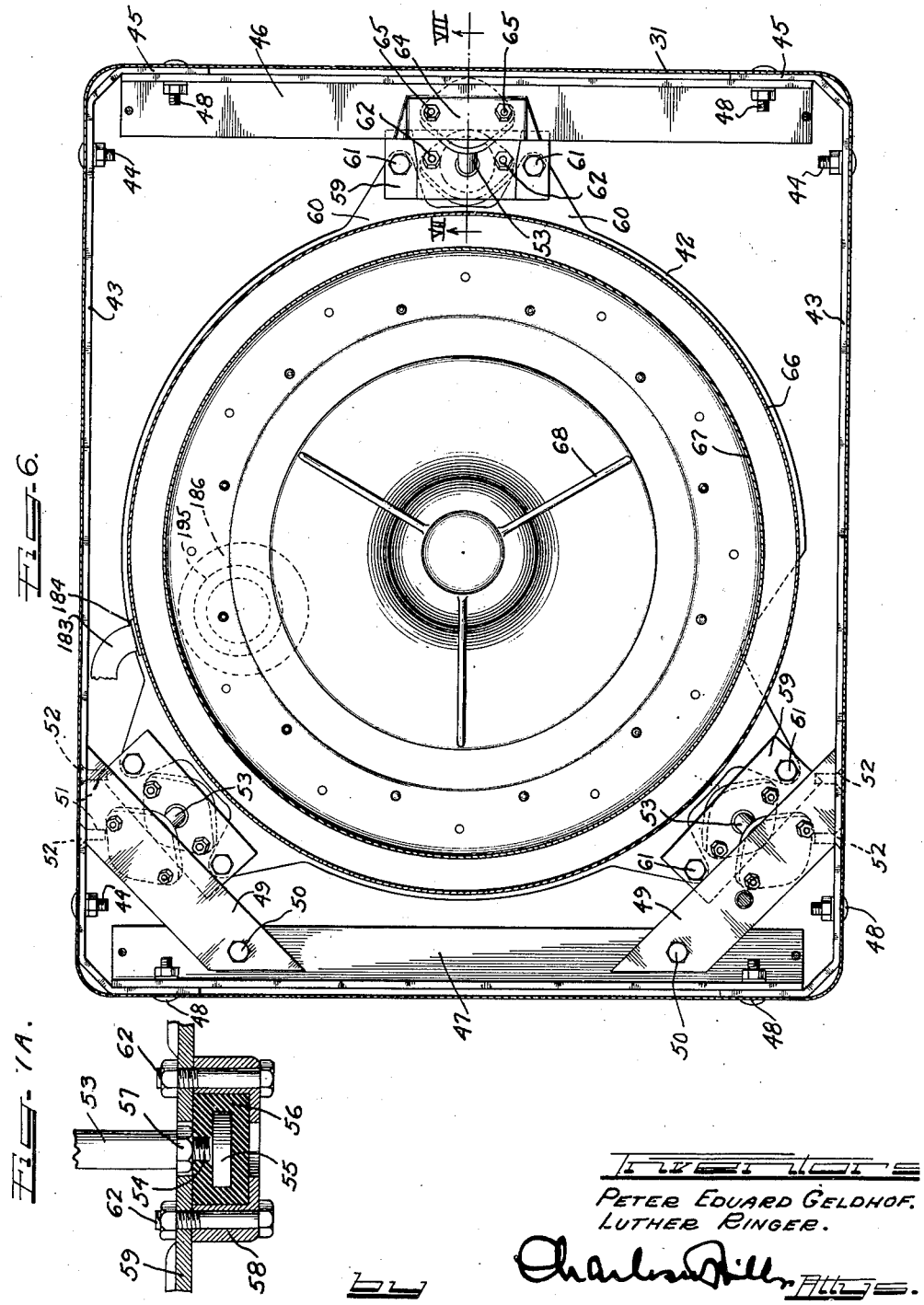
PETER EDUARD GELDHOF.
LUTHER RINGER.

Inventors
Peter Eduard Geldhof.
Luther Ringer.

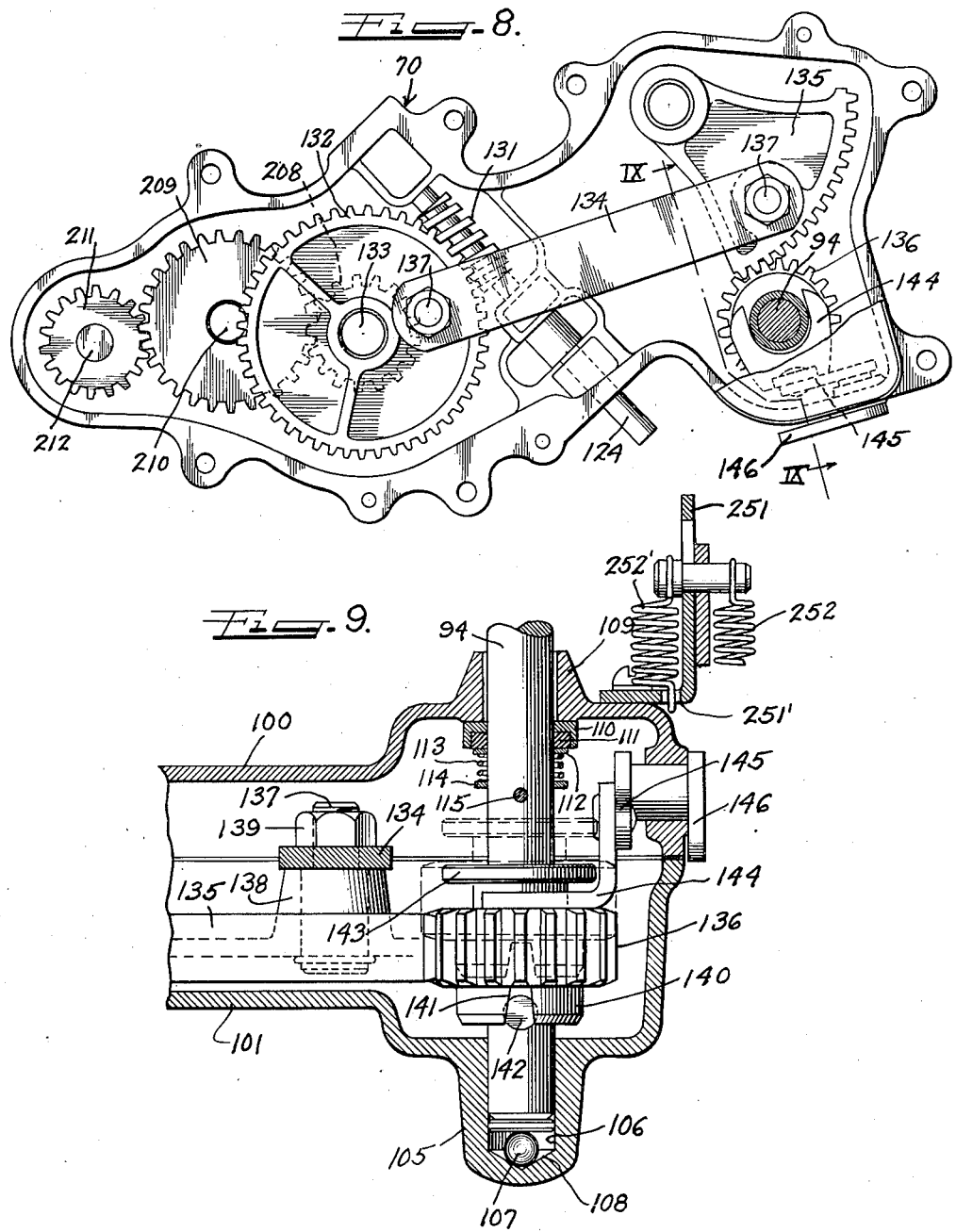

April 25, 1944.  P. E. GELDHOF ET AL  2,347,190
AUTOMATIC WASHER
Filed Dec. 2, 1940  14 Sheets-Sheet 8
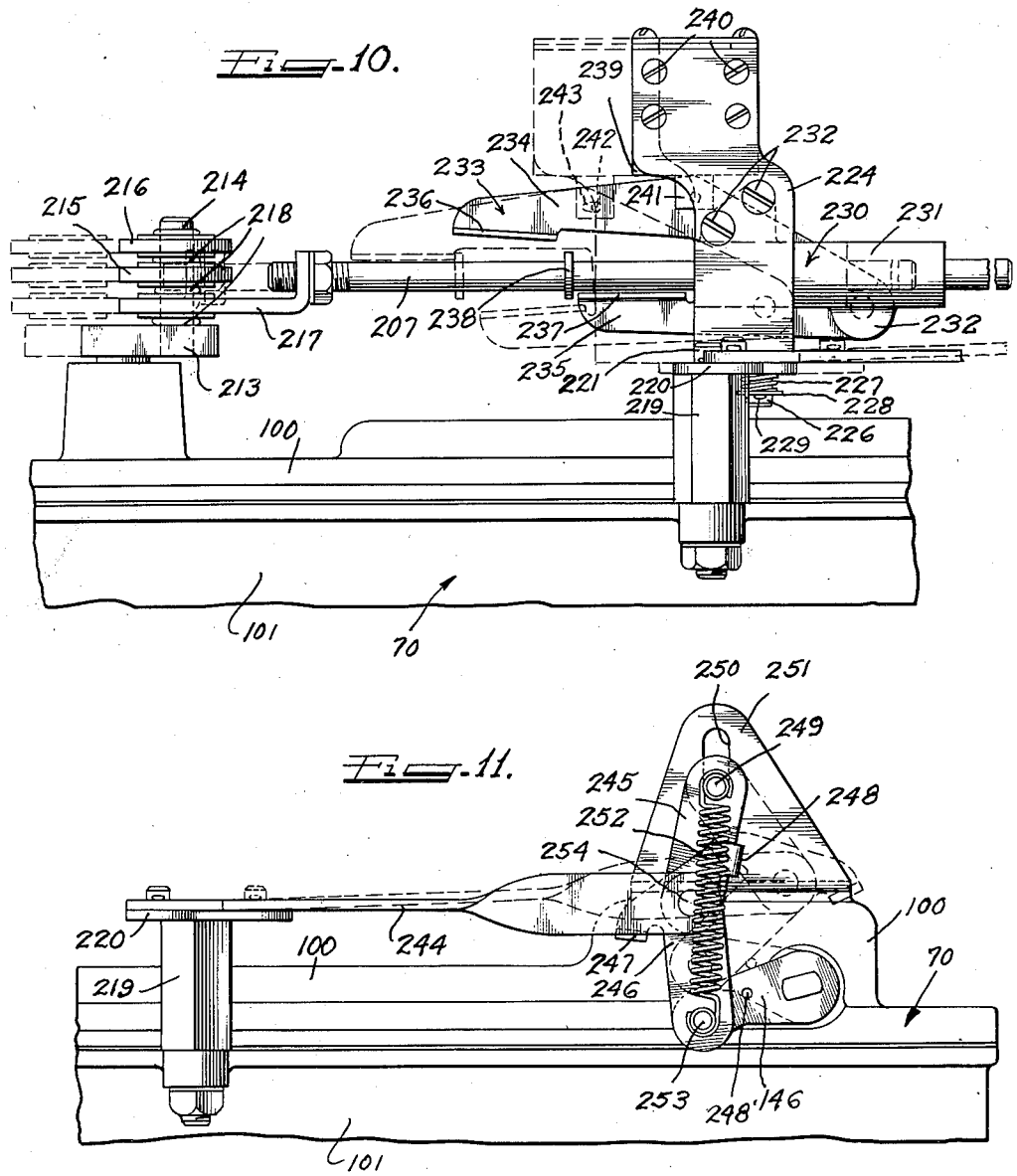
Inventors
PETER EDUARD GELDHOF.
LUTHER RINGER.
by Charles Hill, Atty.

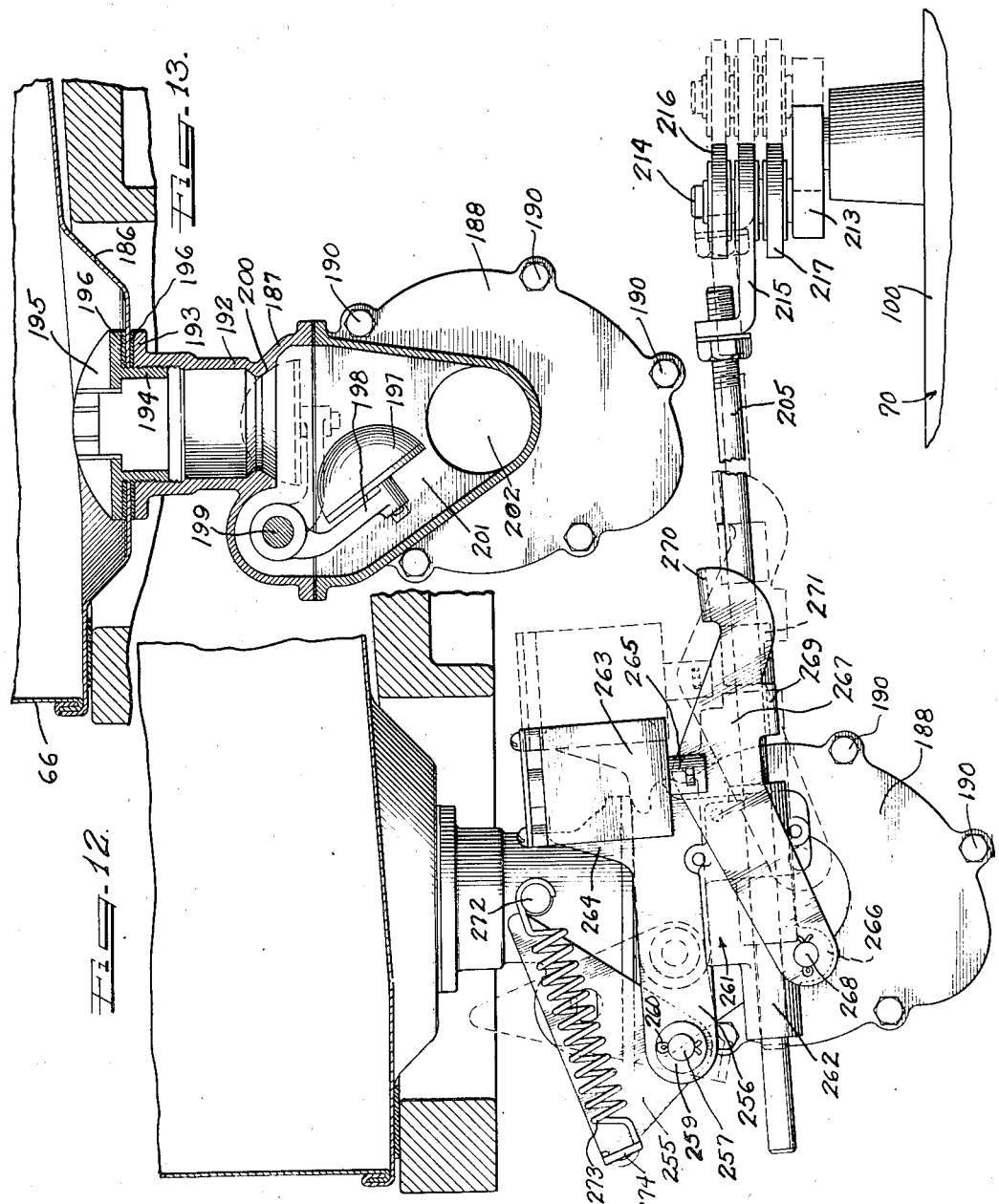

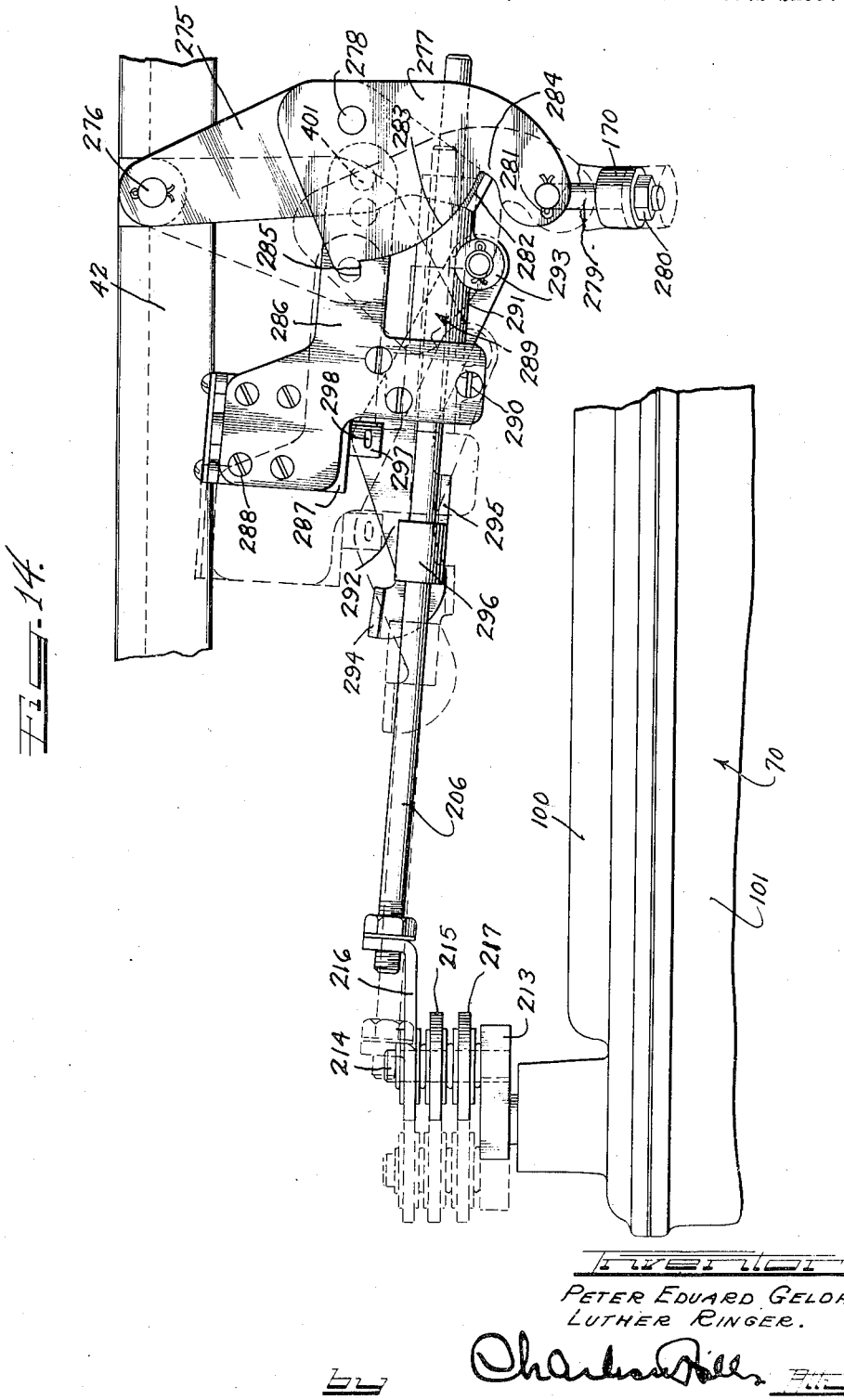

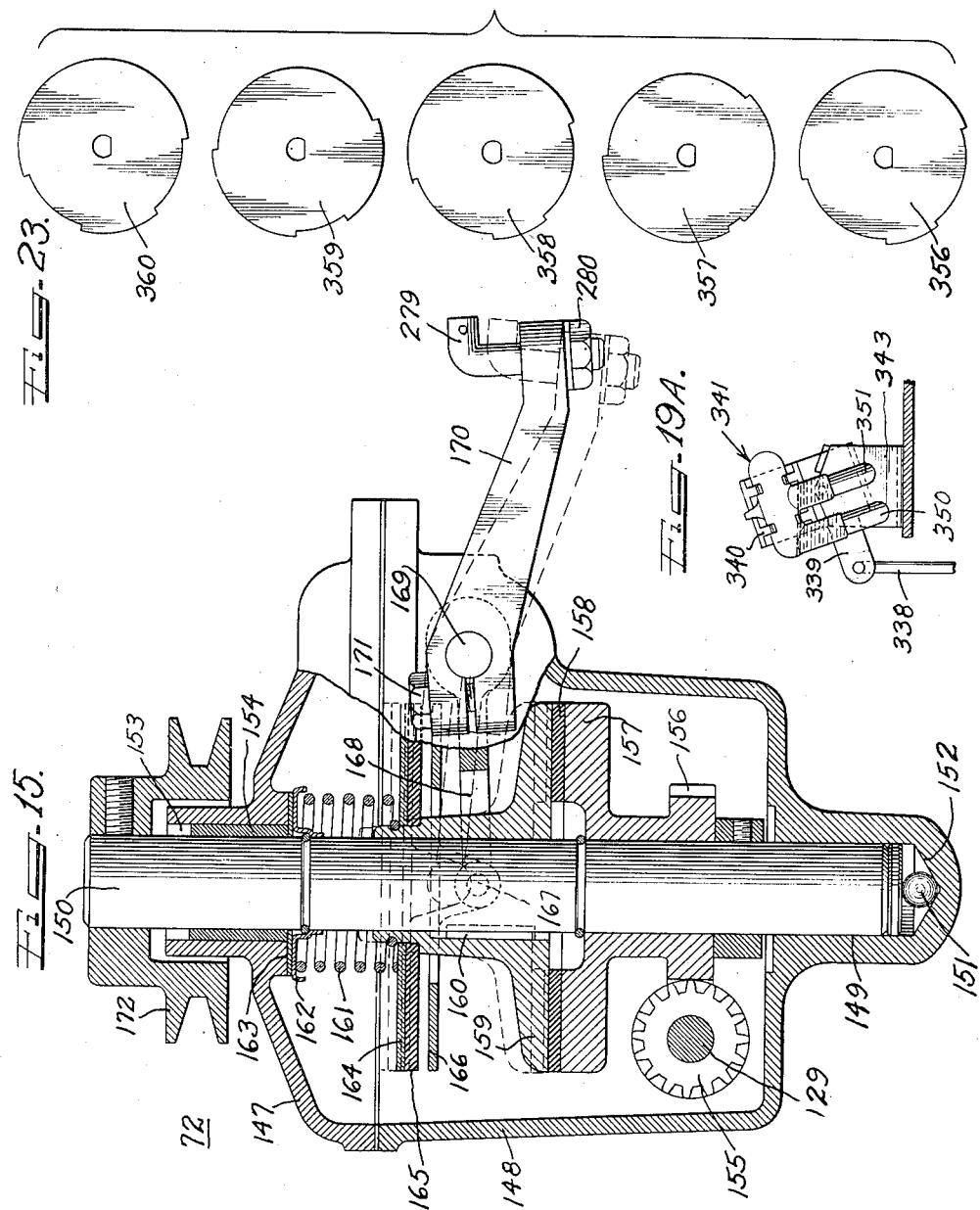

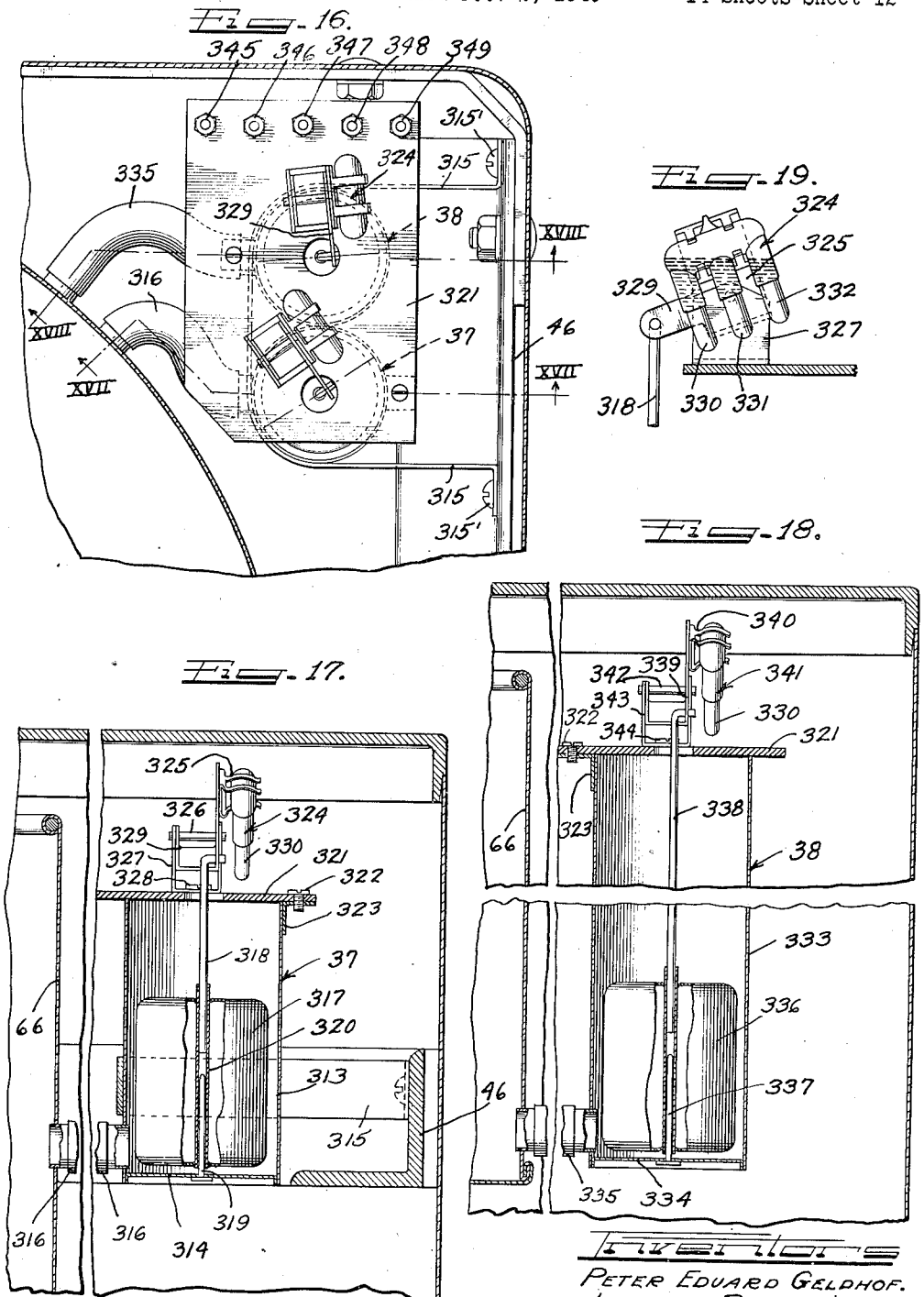

April 25, 1944.   P. E. GELDHOF ET AL   2,347,190
AUTOMATIC WASHER
Filed Dec. 2, 1940     14 Sheets-Sheet 14

Inventors
PETER EDUARD GELDHOF.
LUTHER RINGER.

Patented Apr. 25, 1944

2,347,190

UNITED STATES PATENT OFFICE 2,347,190

AUTOMATIC WASHER

Peter Eduard Geldhof and Luther Ringer, St. Joseph, Mich., assignors to Nineteen Hundred Corporation, St. Joseph, Mich., a corporation of New York Application December 2, 1940, Serial No. 368,190

21 Claims. (Cl. 68—12)

This invention relates to a washing machine, and more particularly to a domestic or household washing machine which is completely automatic in operation in its washing, rinsing and drying of the clothes or other articles to be washed.

In order to reduce the burdensomeness of washing clothes and in order to permit a housewife to instigate the washing operation and then leave the same and return at any later period with the clothes completely washed, rinsed and dried, a novel automatic washing machine has been provided.

One of the features of the present invention is to provide an automatic domestic or household washing machine in which an automatic thermostatic control valve is first set for the desired water temperature and a control switch is set to a predetermined length of washing time. Thereafter, upon closing the switch for energizing the washing machine, the tub fills with water under city main pressure at desired predetermined temperature. When the tub is full, the intake automatically closes, and a mercury float switch causes the agitator of the washing machine to start its washing operation. The washing machine continues to wash through a predetermined cycle, and then the agitator stops and a pump empties the tub rapidly and completely. As soon as the tub is empty, the basket in which the clothes are carried inside of the tub starts spinnig at a high speed and dries the clothes by centrifugal action. After a predetermined drying cycle the basket is stopped and the tub is filled with fresh, clean water, for rinsing. As soon as the tub is filled the agitator operates for a predetermined rinsing cycle, and thereafter the tub is again emptied by the pump. As soon as the tub is completely drained for the second time, the basket is again spun at relatively high speed for the purpose of centrifugally drying the clothes. At the end of this drying cycle, the main switch is opened and the washing machine is completely deenergized, so that it makes no difference when the housewife returns for the clothes, and the machine requires no further attention after it has once been started.

It is an object of the present invention to provide a washing machine having the above highly desirable characteristics.

Another object of the present invention is to provide a novel automatic washing machine which is economical to manufacture, which is simple to operate, which is substantially free from noise and vibration, and which is rugged and reliable in use.

A further object of the present invention is to provide a novel control circuit for an automatic washing machine.

A still further object of the present invention is to provide a novel method and means of supporting and floating the motor, tub, basket, agitator and all drive mechanism of an automatic washing machine.

Another and further object of the present invention is to provide novel control mechanism for the agitator drive, for controlling the operation of the pump, and for operating the extractor or drying basket drive.

Another and still further object of the present invention is to provide a novel electrical control circuit for controlling and governing the starting and duration of each of the desired cycles of operation of the washing machine.

The novel features which we believe characteristic of our invention are set forth with particularity in the appended claims. Our invention itself, however, both as to its manner of construction and method of operation, together with further objects and advantages thereof, may best be understood by reference to the following description taken in connection with the accompanying drawings, in which:

Figure 1 is an isometric view of the washing machine cabinet;

Figure 2 is a plan view of the washing machine cabinet;

Figure 3:
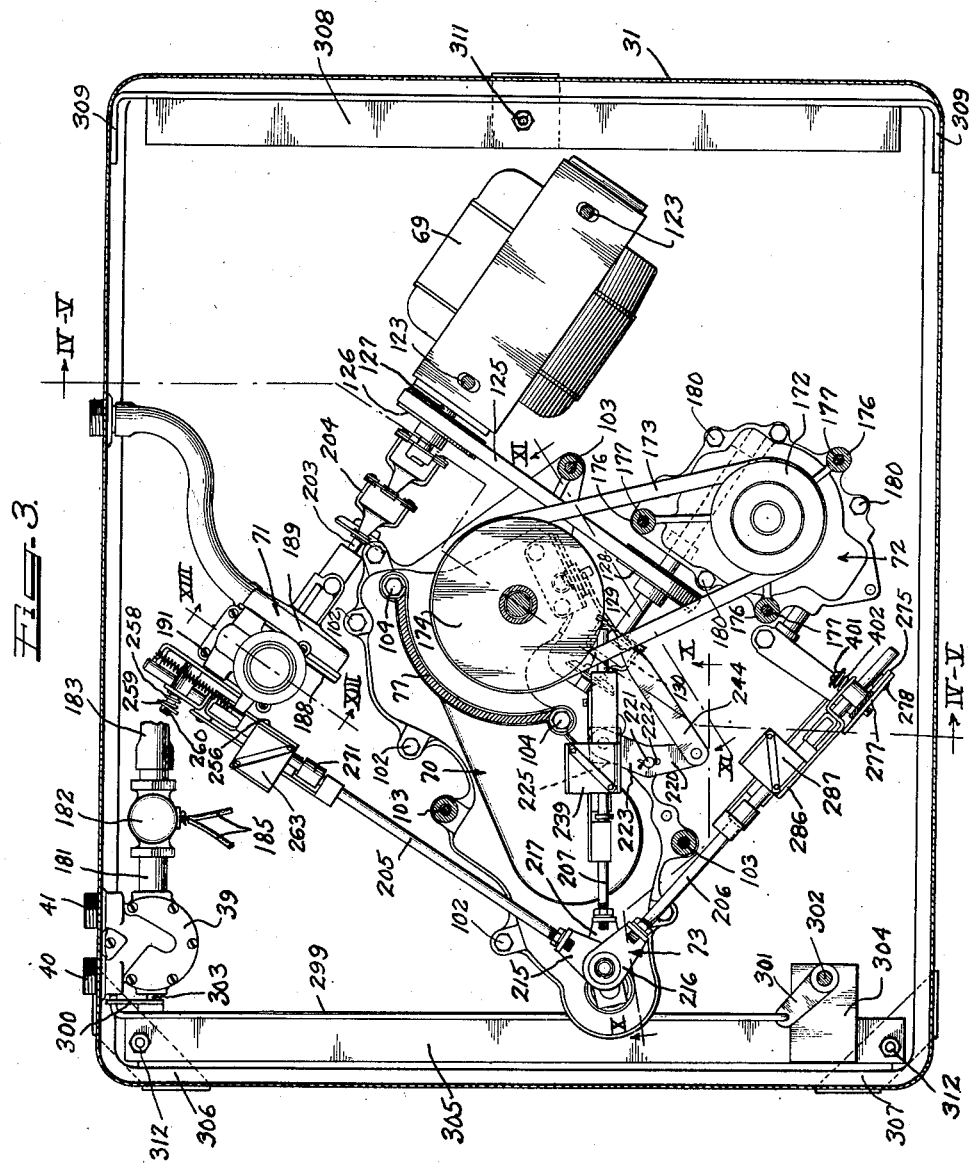
Figure 3 is a horizontal section through the machine below the tub and looking down on the driving and control mechanism.
Figure 20:
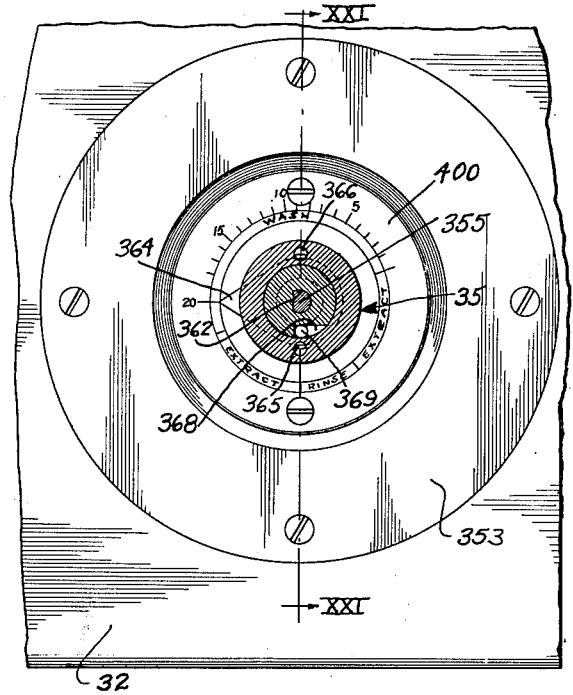
Figure 7:
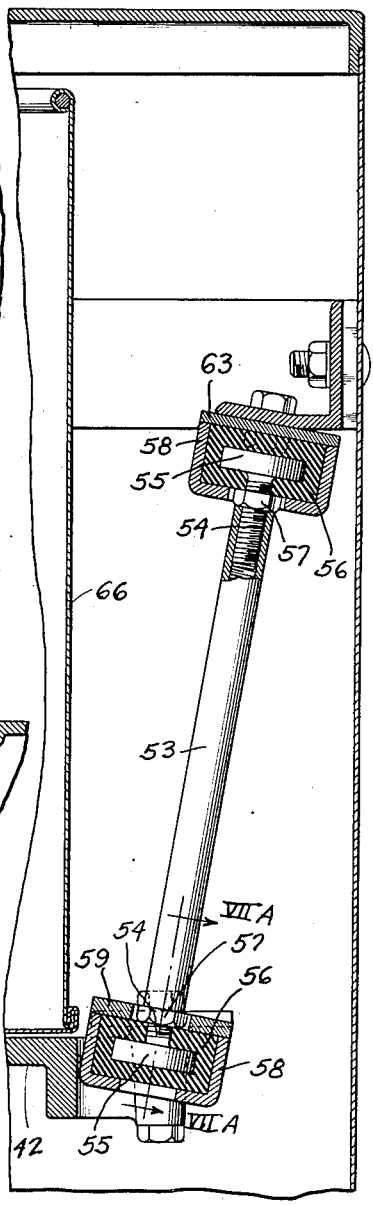
Figure 21:
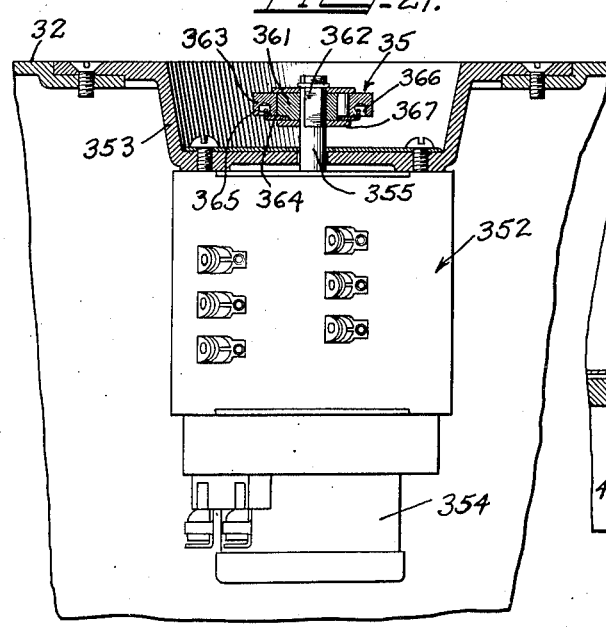
Figure 24:
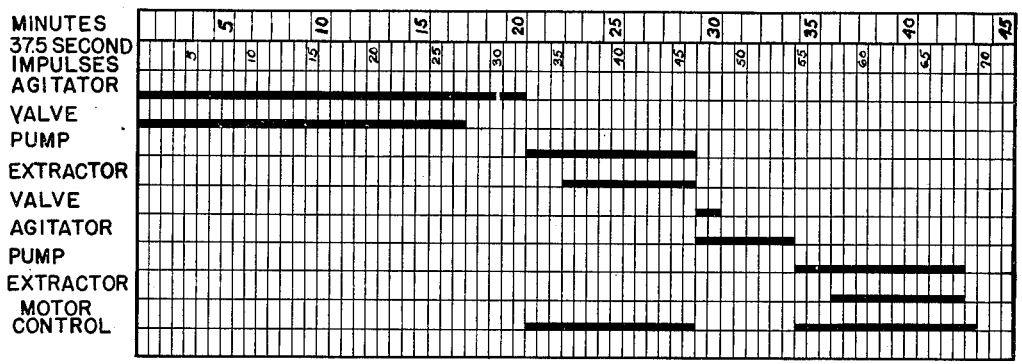
Figure 22:
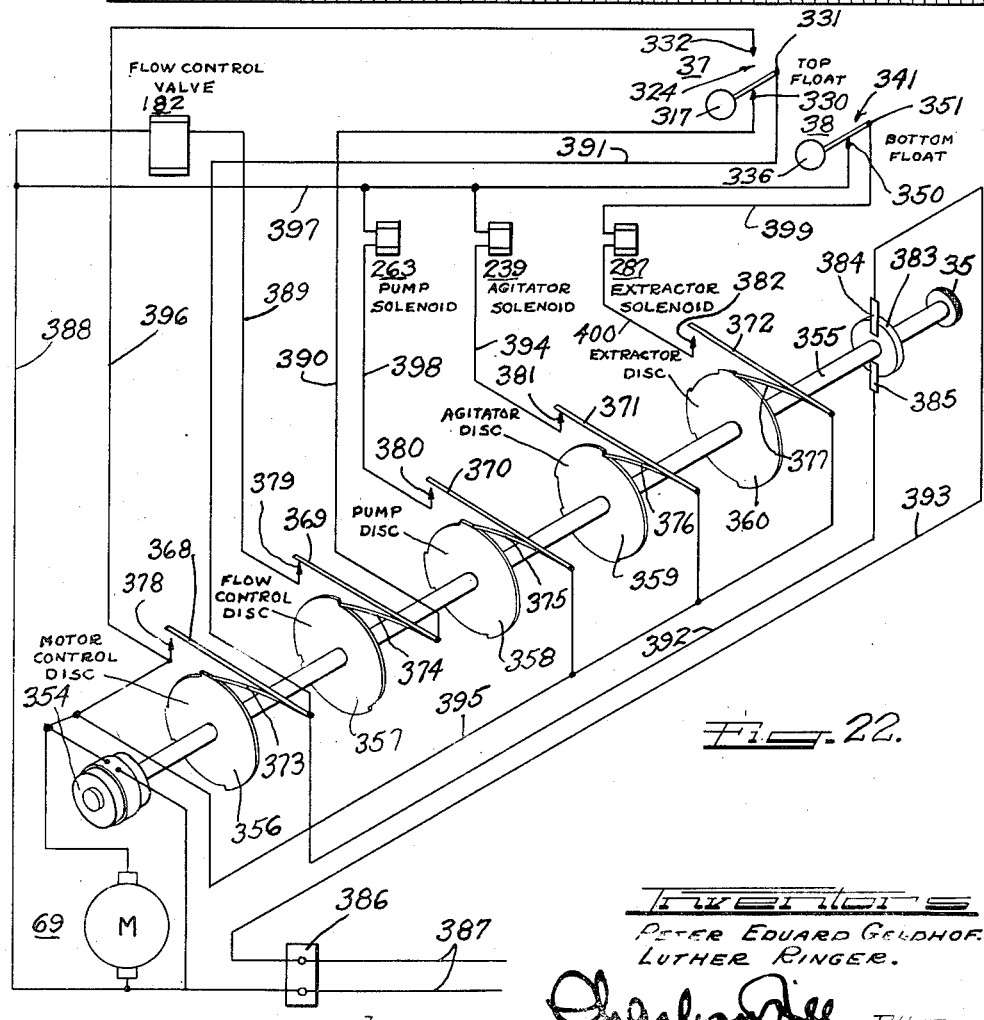
Figure 26:
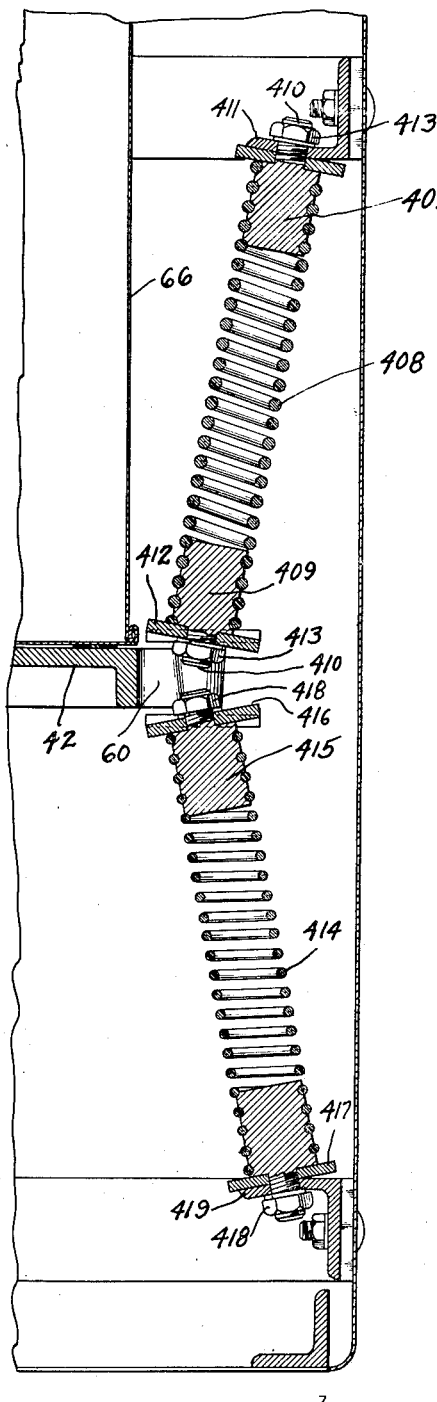
Figure 25:
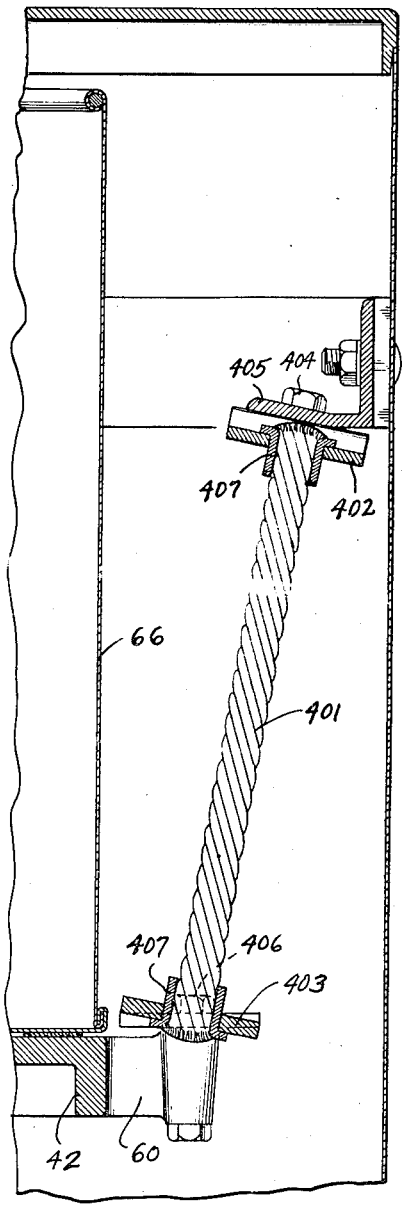

Figures 4 and 5 together form a vertical sectional view through the machine along the line IV—V, IV—V of Figure 3, Figure 4 being the upper portion of the machine and Figure 5 being the lower portion of the machine;

Figure 6 is a horizontal section through the machine along the line VI—VI of Figure 4, looking down on the floating mounting for the tub and drive mechanism;

Figure 7 is a vertical section through one of the tub mechanism supporting means, as taken along the line VII—VII of Figure 6;

Figure 7A is a sectional view of one of the lower suspension pad socket members taken along line VIIA—VIIA of Figure 7;

Figure 8 is a plan view of the transmission with substantially all of the cover broken away;

Figure 9 is a vertical section of a portion of the transmission as taken along the line IX—IX of Figure 8;

Figure 10 is an elevation of a portion of the control mechanism for the agitator drive as viewed along the line X—X of Figure 3;

Figure 11 is an elevation of a portion of the control mechanism for the agitator drive as viewed along the line XI—XI of Figure 3;

Figure 12 is an elevation of the control mechanism for operating the valve on the pump;

Figure 13 is a sectional view of the valve taken along the line XIII—XIII of Figure 3;

Figure 14 is an elevation of the control mechanism for operating the extractor drive;

Figure 15 is a sectional view of the extractor drive;

Figure 16 is a horizontal section through a portion of the machine looking down upon the float mechanism;

Figure 17 is a sectional view of the upper float which regulates maximum height of water in the tub, as taken along the line XVII—XVII of Figure 16;

Figure 18 is a sectional view of the lower float which indicates that the water is out of the tub, as taken along the line XVIII—XVIII of Figure 16;

Figure 19 is an elevation of the mercury switch on the upper float;

Figure 19A is an elevation of the mercury switch on the lower float;

Figure 20 is an enlarged fragmentary plan view of the top corner of the machine showing the timer control knob and indicator;

Figure 21 is a section along line XXI—XXI of Figure 20 of the timer control knob and mounting with the timer in elevation;

Figure 22 is a diagrammatic view of the electrical control circuit;

Figure 23 is a disassembled view of the cam disks on the timer in their respective angular positions relative to each other;

Figure 24 is a chart illustrating the beginning and end of each cycle of operation of the various component parts of the automatic washing machine;

Figure 25 illustrates a modified form of floating assembly employing cables as suspension members; and Figure 26 illustrates a further modified form of floating assembly employing springs as suspension and stabilizing members.

Figures 1 to 26, inclusive, of the drawings illustrate one embodiment of the present invention. The general outer appearance of the automatic washing machine is shown in Figures 1 and 2 and includes, in general, a casing 31 which houses the entire mechanism and control therefor. The casing 31 is closed by a cover plate 32 having a pivotally mounted lid or panel 33 mounted therein, through which the clothes and other articles to be washed may be placed into the machine. In the front left-hand corner of the cover plate 32 is a control knob 34 which regulates the automatic temperature controlled mixing valve. In the front right-hand corner of the machine is the main control knob 35 of the automatic timer, in which the length of the washing cycle may be predetermined and set within certain limits. In order that the relative location and orientation of parts may be fixed at a glance, the top 36 of the tub has been dotted in, in Figure 2, and the relative location of the two float-controlled units 37 and 38 are also shown by the dotted line. It will be noted that these two float-controlled units 37 and 38 are in the right rear portion of the casing 31. As is also indicated by the dotted lines in Figure 2, the left rear portion of the casing 31 contains the mixing valve or automatic temperature control unit 39. Inlets 40 and 41 are the hot and cold water intakes for supplying the necessary amount of water at city main pressure.

*The floating base*

As may be seen best in Figures 3 to 7, inclusive, substantially all of the operating mechanism of the washer is mounted on a floating base member or casting 42, which is suspended from the side walls of the casing 31. Secured to two of the inner faces of the casing 31 are bars 43 which are bolted to the casing as at 44. These bars are preferably of such length as to completely extend across the side on which they are mounted and around the adjacent corners in end portions 45. The other two inner faces of the casing 31 have angle irons 46 and 47 secured thereto by bolts 48 which pass through the casing, the end 45 of the bars 43, and the angle irons 46 and 47.

A pair of suspension brackets 49 are mounted across the corners of the casing 31 adjacent the angle iron 47. These suspension brackets 49 are preferably made of relatively thick stock (for example, half-inch stock) and are apertured at one end for the reception of the mounting bolt 50 which secures the brackets to the angle iron 47. The brackets 49 are provided with a pair of tapped holes 51 in their opposite ends for receiving a pair of bolts 52 whose heads are countersunk in the bar 43 and do not extend through the casing wall 31.

The supporting base or spider 42 is suspended directly from the angle iron 46 and the suspension brackets 49 by a set of suspension rods 53. The details of construction of the suspension rods 53 and their associated structure may be seen best from an examination of Figure 7. The opposite ends of the suspension rods 53 are bored and tapped for the reception of the threaded shank of a bolt 54. These bolts 54 are provided with relatively large heads 55, which have a molded rubber cushioning pad formed thereround as at 56. A nut 57 is provided on each bolt 54 to limit the extent to which the bolt may be screwed into the suspension rod 54.

Each cushioning pad 56 is contained within a suspension pad socket 58. The lower suspension pad socket 58 is closed off by means of a bracket 59 which is centrally apertured to permit free movement of the suspension rod 53 and the shank of its associated bolt 54 to freely move therein. The bracket or strap 59, however, prevents the rubber cushion pad 56 from coming out of the socket 58. The bracket or strap 59 is bolted to a pair of projecting ears 60 on the supporting base or spider 42, as at 61, and is also bolted to the lower suspension pad socket 58 by bolts 62 which extend from the base of the socket 58 alongside of the rubber pad 56 (see Fig. 7A).

One of the upper suspension pad sockets 58 is closed by a cover plate 63 and is directly bolted to a slightly bent-up portion 64 of the angle iron 46 by bolts 65 which extend from the base of the socket 58 through the cover plate 63 and the bent-up portion 64 of the angle iron 46. The other two suspension rods which are supported from the suspension brackets 49 are similar to the suspension rod connected to the angle iron 46 with the exception that the upper plate 63 of each of the former suspension rods and the sockets 58 are directly bolted to the brackets 49, rather than to the angle iron 47.

From the above description it will be understood that a floating mounting is provided for the supporting base or spider 42. It will also be noted that the rubber above the bolt head 55 in the lower socket 58 is under a compressive force, while the rubber below the bolt head 55 in the upper socket member 58 is also subjected to a compressive force.

Substantially all of the principal operating and control mechanisms of the washing machine is mounted on and carried by the base member or spider 42. Referring to Figs. 3, 4, and 5 of the drawings, which together form a vertical sectional view through the machine, it will be observed that a wash tub 66 is mounted on the base 42, and rotatably mounted within the wash tub 66 is a perforated drying basket 67. Within the drying basket 67 is an agitator 68 which is arranged to operate in a manner presently to be described. Suspended from the under side of the base 42 is a motor 69, a transmission 70, an extraction pump 71, a drier transmission and clutch mechanism 72, and control mechanism 73.

It has been found desirable under some circumstances to increase the mass of the base 42 above that which is necessary to provide a member with sufficient strength to support the various washing machine mechanisms. By artificially loading the base 42, i. e., by making it abnormally heavy, its inertia is increased. This tends to reduce vibration in the machine.

The tub drying basket and agitator

The tub drying basket and agitator assembly, as shown in detail in Figures 4 and 6, includes a tub 66 having a base portion 74 which is centrally apertured to permit the drive shafts for the drier basket 67 and the agitator 68 to pass therethrough. The supporting base or spider 42 is also centrally apertured as at 75, into which the boss 76 of the casting 77 is fitted. The casting 77 has a threaded central opening through the boss 76 which receives the lower threaded end of the center post 78. This center post 78 has an outwardly projecting shoulder or flange 79 adjacent the threaded end portion 80 thereof. Suitable gaskets or sealing rings 81 and 82 are placed on opposite sides of the base portion 74 around the central aperture, and the center post is then inserted through this opening and threaded into the casting 77 and screwed up tight. It will be understood that this center post 78 must make a fluid-tight seal with the base portion 74 of the tub 66 in order to prevent leakage of water from the tub.

The perforated drying basket 67 is carried on a hollow shaft 83 which extends up through the center post 78. While only a relatively small number of holes are shown in the basket 67 in Figure 4 of the drawings, it will of course be understood that the entire basket is provided with perforations to permit the passage of water therefrom. This basket 67 is mounted on the end of the hollow shaft 83 by providing an intermediate collar 84 which is press-fitted or otherwise suitably secured on the upper end of the hollow shaft 83. The collar 84 is provided with a lower tapered shoulder 85, upon which the basket center post 86 is seated. The basket center post 86 is riveted or otherwise suitably secured to the base portion 87 of the basket 67 by means of rivets 88 or the like. Preferably, a reinforcing plate 89 is also provided to stiffen the base portion 87 of the basket. The upper end of the basket center post 86 is preferably keyed to the intermediate collar 84 as at 90, and a retaining ring 91 is threaded onto the upper end of the intermediate collar member 84 to force the center post 86 tightly down onto the seat 85. A sleeve bearing 92 is provided within the stationary center post 78 in which the hollow shaft 83 rotates. A packing gland or sealing ring 93 is preferably provided at the upper end of the sleeve bearing 92.

As will presently be explained, the hollow center post 83, which carries the perforated basket 67, is arranged to be rotated at relatively high speed (such, for example, as 650 R. P. M.) for the purpose of centrifugally drying any clothes or other articles carried in the basket 67.

Extending up through the center of the hollow shaft 83 is a solid shaft 94 upon which the agitator 68 is mounted. More specifically, the upper end of the shaft 94 is splined as at 95 and is adapted to receive a complementary formation on a collar 96, which is press-fitted or otherwise secured in the upper end of the agitator 68. The agitator is preferably retained in place vertically by means of a plate 97, which is bolted on the end of the shaft 94 as at 98. The shaft 94 passes up through a sleeve bearing 99 which is carried in the upper end of the hollow shaft 83.

The agitator 68 is shown as being of the multiple vane high center post type and is oscillated back and forth about a vertical axis to wash clothes and other articles in a manner well known to those skilled in the art.

The manner in which the agitator shaft 94 and the basket shaft 83 are vertically supported in the assembly may be seen best from inspection of Figures 3, 5 and 9 of the drawings.

The transmission 70 is housed within a casing formed of upper and lower castings 100 and 101, which halves are bolted together as at 102. This casing, comprising the upper and lower castings 100 and 101 is directly bolted to the under side of the base or spider 42 by means of bolts 103 (see Fig. 3). The casting 77 is also provided with a downwardly depending skirt which is bolted to the upper casing casting 100 as at 104.

As shown in Figures 5 and 9, the lower casing casting 101 is provided with a depending boss 105 which is internally bored as at 106. The lower end of the agitator shaft 94 extends down into the bore 106 and is seated on a steel ball 107 which acts as a thrust bearing for the shaft. The ball 107 is preferably seated in a conical end portion 108 of the bore 106.

The shaft 94 extends up through the upper casting 100 and is spaced therein as at 109. Since the mechanism of the transmission 70 is preferably arranged to run in oil or other suitable lubricant, a packing gland assembly is provided for the shaft 94 which includes a cup-shaped collar 110 in which a packing ring 111 is seated. A ring or washer 112 is slipped over the shaft 94 against the packing ring 111. A coil spring 113 which extends around the shaft between the washer or ring 112 and a second washer or ring 114 normally holds the packing gland assembly in desired position. A pin 115 on the shaft 94 limits the downward movement of the lower washer or ring 114.

The basket-carrying shaft 83 is supported on and carried by the shaft 94, as may be seen from an inspection of Figure 5. More particularly, a sleeve bearing 116 is keyed or otherwise suitably secured to the lower end of the hollow shaft 83. The sleeve bearing 116 has a lower foot or thrust-bearing portion 117. Clamped on the shaft 94 below bearing 116 is a lower thrust-bearing member 118, on which the thrust-bearing foot portion 117 is seated. The member 118 is preferably locked in place on the shaft 94 by means of a set screw or bolt 119. The lower portion of the member 118 is provided with a skirt 120 which overhangs the upper portion of the casting 100 at the point where the shaft 94 passes therethrough, to prevent foreign material from working down into the casing which houses the transmission 70.

*The driving mechanism*

The driving mechanism for oscillating the agitator 68 and for whirling the perforated basket 67 is suspended from and mounted below the base plate or spider 42. Power is derived from an electric motor 69, which is supported by a bracket 121 which straddles the motor 69 and is bolted or otherwise suitably secured to a boss 122 formed on the under side of the base member 42. The bolts for this purpose are shown in section at 123 in Figure 3.

One particular manner of locating the motor 69 is to suspend it from the under side of the base member 42 in such a position that it lies directly opposite the suspension rod 53, which is carried by the angle iron 46. This particular location and orientation of the motor with respect to the point of suspension of the spider has been found to be advantageous and will be discussed presently in detail.

The motor 69 drives the agitator 68 and certain control mechanism presently to be described, through the transmission 70. The motor 69 also drives the perforated basket 67 through the transmission and clutch mechanism 72. The pump 71 is directly driven from the motor 69.

Turning now to a consideration of the agitator drive, attention is directed to Figures 3 and 8 of the drawings. The transmission 70 includes a drive shaft 124 which is directly driven from the motor 69 by a belt drive 125. To this end a suitable pulley 126 is secured to the motor shaft 127 of the motor 69 and a second pulley 128 is mounted on a connecting shaft 129 which, in turn, is connected to the drive shaft 124 of the transmission 70 through a flexible coupling 130. The connecting shaft 129 is rotatably supported in the casing of the drier basket transmission and clutch mechanism 72.

The drive shaft 124 of the transmission 70 has a worm 131 formed on one end thereof within the casing of the transmission unit 70. This worm 131 drives a worm-wheel 132 which is rotatably mounted on a short stub 133. The wormwheel 132, through a crank arm or link 134, operates a gear sector 135 which in turn is meshed with a gear 136 that is rotatably mounted on the agitator shaft 94. While the link arm or crank 134 may be connected to the worm wheel 132 and the sector gear 135 in any suitable manner, it is preferably mounted on short stubs 137 which extend up through raised bosses 138 on the respective gears. The link arm is retained in place by means of nuts 139.

As may be seen best in Figure 9, the gear 136 is longitudinally slidable on the shaft 94 and is provided with a lower hub portion 140 which is slotted as at 141 to fit over a pin 142 carried in the shaft 94. It will thus be apparent to those skilled in the art that the gear 136 may be locked to the shaft 94 by lowering the hub portion 140 down to fit over the pin 142.

The upper portion of the gear 136 is provided with a collar portion 143 under which a fork or yoke 144 fits. This fork is pivotally mounted on a rotatable arm 145 which is pivotally mounted in the upper casing member 100. The rotatable arm 145 is connected to and forms a rigid construction with a control arm 146 on the outside of the casing member 100. When the control arm 146 is rocked upwardly it will be understood that the fork 144 is raised, causing the gear 136 to be disengaged from operative connection with the shaft 94.

From the above description it will be understood that rotation of the worm wheel 132 by the drive shaft 124 causes oscillation of the agitator shaft 94 about its own axis whenever the gear 136 is in engagement with the pin 142 on the shaft 94.

The drive from the motor 69 to the perforated basket 67 is also through the belt drive 125 and the connecting shaft 129.

Turning now to Figures 5 and 15, it will be seen that the connecting shaft 129 passes within the casing of the transmission mechanism 72 for driving the latter. The transmission mechanism 72 is housed by a pair of casing members 147 and 148, member 148 being formed with a well portion or bore 149 in its base, in which a rotatable shaft 150 is mounted. The shaft 150 is supported on a steel ball 151 which is seated on a conical portion 152 in the end of the bore 149. The upper casing member 147 is provided with an opening 153 in which a sleeve bearing 154 is fitted. The sleeve bearing 154 acts as a horizontal guide bearing for the upper portion of the shaft 150.

The drive from the motor 69 to the perforated basket 67 is through the shaft 150. This is accomplished by securing a spiral pinion 155 to the connecting shaft 129. The spiral pinion 155 meshes with a spiral gear 156 having a running fit with the shaft 150. Integral with the spiral gear 156 is a disk 157 which is arranged to be frictionally engaged by a surface of brake material 158 at the lower end of an axially slidable member 159 which is keyed against rotation relative to shaft 150, as at 160. A coil spring 161, which is seated at one end in an end cap 162 against a shoulder 163 of the upper housing member 147, is seated at its lower end against a disk 164 which is secured to and forms an integral part of the member 159. Thus, the spring 161 urges the member 159 downwardly and tends to cause the friction surface 158 to become engaged with the disk 157, so that the rotation of the latter will be imparted to the shaft 150.

The under surface of the disk 164 is provided with a suitable friction material to provide a friction surface as at 165. A control disk 166 is pivotally mounted as at 167 to the end of a control arm 168. The control arm 168 is, in turn, mounted on a short shaft 169 which passes through the side wall of the lower casing member 148, and an operating arm 170 is secured to the shaft 169 as at 171. The confronting surfaces of members 157 and 158 are disengaged by the action of the disk 166, for when the disk 166 is raised it engages the friction surface 165 and causes the member 159 to be raised against the action of the biasing spring 161.

When the various component parts of the unit 72 are in position as shown by the dotted lines in Figure 15, the disc 166, in bearing against the braking surface 165, not only acts as a means to lift the surface 158 out of engagement with the disk 157 but also applies a braking action to the shaft 150 and tends to bring this shaft to rest and then hold it at rest.

At the upper end of the shaft 150, above the upper casing member 147, there is secured a pulley 172 that is connected by a belt 173 (see Figs. 3 and 5) with a pulley 174 which, in turn, is tightly secured on the lower end of the hollow shaft 83. It will thus be understood that any rotation of the shaft 150 is transmitted directly to the perforated basket 67.

The transmission and brake unit 72 is supported from the under side of the base or spider 42. The under side of the base 42 is provided with depending bosses 175. The casting which forms the upper cover or casing member 147 is provided with upstanding tubular portions or sleeves 176. Long bolts 177 pass up through the flange 178 on the lower casing member 148, through the tubular portions or sleeves 176, and into threaded engagement with the bosses 175 to support the casing formed by the upper and lower casing members 147 and 148 on the under side of the base 42. The upper casing member 147 is also provided with a flange 179 which is complementary to the flange 178 on the lower casing member 148, and these two flanges are additionally bolted together as at 180.

Tub filling and draining mechanism

The tub filling and draining mechanism will now be described.

Water is supplied to the tub 66 under ordinary city water pressure through a temperature mixing valve 39, a flow control valve 182, and a flexible hose 183 (see Figure 3). The flexible hose 183 is shown as being connected to the side wall of the tub 66 immediately above the casting 42, as indicated at 184 in Fig. 6. It will be understood that the automatic temperature control unit or temperature mixing valve 39 is arranged to receive hot water and cold water through intakes 40 and 41 and to automatically control the relative amount of each, so that water of desired temperature under ordinary city water pressure passes through the outlet pipe 181 of the temperature mixing valve 39 to the flow control valve 182. The details of the temperature mixing valve are not shown, for any conventional temperature mixing valve may be employed. When the flow control valve 182 is open, it will be understood that the tub 66 is supplied with water of desired temperature. The flow control valve 182 is preferably of the electrically operated solenoid type, wherein the valve is opened whenever current is supplied to the solenoid through electric conductor 185.

In order to withdraw water from the tub 66, a centrifugal pump 71 is provided in the drain. Referring particularly to Figs. 3, 6, 12 and 13, it will be seen that the base 74 of the tub 66 has a depressed portion 186 formed therein. The combination valve and pump unit 71 is mounted directly below the depressed portion 186 of the tub 66 and includes an upper casing member 187 and two lower casing members 188 and 189. Lower casing members 188 and 189 are bolted together as at 190 (see Fig. 13) while the upper casing member 187 is bolted to the assembly as at 191 (see Fig. 3). The casting forming the upper casing member 187 is provided with an upstanding tubular portion 192 having a flange 193 at its upper end. The tubular portion 192 is internally threaded for the reception of the depending threaded collar 194 of the drain cap 195. Two gaskets 196 are provided on opposite sides of the depressed portion 186 so that when the cap 195 is screwed tightly into the tubular portion 192 a fluid-tight joint is made with the tub 66.

A valve 197 in the form of a hemispherical member is mounted on an arm 198 which is secured to a shaft 199 passing through the wall of the upper casing member 187. The valve 197 is arranged to be rocked into and out of tight seated engagement with a valve seat 200 formed at the lower end of the tubular portion 192.

As is clearly shown in Figure 13, a chamber 201 is provided below the valve 197 and in which the valve moves. This chamber 201 opens into the pump chamber through a passageway 202. While the pump chamber is not shown in detail, it will be understood that a rotatable impeller is housed within the lower casing members 188 and 189, the impeller (not shown) being mounted on an impeller shaft 203. As is clearly shown in Figure 3, the impeller shaft 203 is directly connected to the motor 69 through a flexible coupling 204. It will thus be understood that whenever the motor 69 is in operation, the impeller shaft 203 is rotated and the pump is driven. Water will be extracted or withdrawn from the tub 66, however, only when the valve 197 is opened, as is shown in the full line position of Figure 13.

The control mechanism

The control mechanism, which forms one of the most important features of the present invention, will now be described.

This mechanism may be seen best from an examination of Figures 3, 8, 10, 11, 12 and 14. The valve in the pump unit 71, the clutch in the drier gear case 72, and the clutch 141 for the agitator in the transmission 70, are actuated by three reciprocating rods 205, 206 and 207, respectively, which are spread out in fan-shape below the base 42 but above the upper casing member 100 of the transmission unit 70. Control arms 205, 206 and 207 are continually reciprocated longitudinally on their own axes as long as the motor 69 is running. Reciprocatory movement of each of the control arms is obtained by providing a pinion gear 208 on the worm wheel 132 which meshes with an intermediate gear 209 which is mounted on a stub shaft 210 in the gear case of the transmission unit 70. Gear 209 in turn meshes with a gear 211 which is secured to a shaft 212 projecting up through the upper casing member 100 of the transmission unit 70. An eccentric arm or crank 213 is secured to the shaft 212 and carries an upright post 214 which is in an eccentric position with respect to the shaft 212. Three link plates 215, 216 and 217, which are threaded on to the ends of the shafts 205, 206 and 207, respectively, are rotatably mounted on the upright post 214. Spacers 218 are preferably provided to separate the link plates 215, 216 and 217 from each other and from the eccentric arm or crank 213.

The agitator control mechanism is mounted on a post 219 carried by the upper and lower housing members 100 and 101 of the transmission unit 70. A bell crank arm 220 is pivotally mounted on a short pin 221 which projects up from the top of the post 219, the bell crank 220 being held in place thereon by a cotter pin 222. One end 223 of the bell crank arm 220 projects out under the rod 207. A supporting plate 224 is mounted on the end 223 of the bell crank 220 and is shaped to extend up past the rod 207 to a point somewhat above the latter. This supporting plate is provided with a bent-over base or foot 225 which is seated on the end 223 of the bell crank 220 and is held in place by a downwardly projecting pin 226 which passes freely through a complementary hole in the end portion 223 of the bell crank 220. A coil spring 227, a washer 228, and a cotter pin 229 resiliently hold the supporting plate 224 in tight seated engagement on the end of the bell crank 220. A casting 230 having a relatively long tubular portion 231 is bolted to the upright arm 224 as at 232. The tubular portion 231 has an axial bore through which the rod 207 projects. It will thus be understood that the free end of the rod 207 is carried and supported by the casting 230 which, in turn, is carried and supported on the bell crank 220.

On the under side of the tubular portion 231 of the casting 230 a boss 232 is provided to which a forked member 233 is pivotally connected. The forked member 233 has an upper arm portion 234 and a lower arm portion 235 which terminate in laterally projecting ears 236 and 237, respectively, and which ears straddle the rod 207 in the manner shown. A collar or ring flange 238 is formed on the rod 207 so as to be engaged by the left-hand edge of the lower end portion 237 or the right hand edge of the upper end portion 236 (as viewed in Figure 10 of the drawings) depending upon the position of the forked member 233 and the position of the flange 238.

Movement of the forked member 233 is obtained by a solenoid unit 239 (see Fig. 3) which is bolted to the upright arm 224 as at 240 and which is equipped with a movable plunger or armature 241. The plunger or armature 241 is equipped with a pin 242 which projects into a slot 243 in the upper arm 234 of the forked member 233. The details of construction of the solenoid unit 239 are not shown, but it is to be understood that any suitable conventional type of solenoid having a movable plunger therein may be employed. It will further be understood that whenever the solenoid 238 is energized the forked member will be raised to the position as shown by the full lines in Figure 10. Whenever the solenoid 239 is deenergized the forked member drops, so that the laterally projecting ear 236 rests on the rod 207.

With the elements as shown in Figure 10 it will be observed that the solenoid is now in its energized position, for the forked arm 233 is in its uppermost position. As soon as the solenoid is deenergized the forked arm 233 will drop down so that the laterally projecting ear 236 rests on the rod 207. Since the rod 207 is being reciprocated longitudinally, the collar or flange 238 will engage the laterally projecting portion 236 and carry the forked arm to the left until it reaches a position as shown by the broken lines of Figure 10. As the forked arm 233 is carried to the left, the associated structure on which it is mounted is also carried to the left, thus causing the bell crank arm 220 to be moved in a counterclockwise direction when looking down on it (see Figure 3).

It will also be observed from inspection of Figure 10 that if the solenoid is deenergized at a time when the collar or flange 238 is under the laterally projecting ear 236 the latter will merely rest on the flange 238 until it has moved back to a position where the ear 236 may drop down onto the rod 207.

Assuming that the forked arm is in the position as shown by the broken lines in Figure 10, the bell crank lever will be moved back to its original position upon the energization of the solenoid 239, for this will move the laterally projecting ear 237 of the arm 235 up against the rod 207. In this position it will be engaged by the flange 238 of the rod 207 and moved back to the full line position as shown in Fig. 10. Here again it will be observed that if the flange 238 is opposite the ear 237 at the time when the solenoid 239 is energized, the ear 237 will merely bear against the flange until the latter moves free thereof, at which time the ear 237 will continue its movement upwardly until it rests against the rod 207.

The manner in which the movement of the bell crank 220 effects control of the agitator drive may be seen best from an inspection of Figures 3 and 11. The bell crank arm 220 is pivotally connected to a link 244 which in turn is pivotally connected to two link arms 245 and 246. The link arm 246 is pivotally connected on the end of the crank arm 146, which has previously been described in connection with Figures 8 and 9 of the drawings. This link has two laterally projecting ears 247 and 248 which act as stops in a manner presently to be described. An additional stop pin 248' may be provided on arm 146, if desired. The upper link 245 is pivotally mounted on a pin 249 which is free to ride up and down in the slot 250 of a plate 251 mounted on the upper casing member 100 of the transmission unit 70. A spring 252 is connected at one end to the pin 253 which pivotally connects the lower link arm 246 with the crank arm 146 and the pin 249. This spring 252 thus normally tends to collapse the two links 245 and 246. A second spring 252' extends down on the back side of the plate 251 and is fastened at one end to pin 249 and at the other end to a lower portion 251' of the plate 251 (see Figure 9). The spring 252' has no influence on the operating mechanism, but is employed as a yielding member when collar 140 does not mate with pin 142 to cause proper mating when the slot and pin do line up. In their position as shown in Figure 11 of the drawings, links 245 and 246 are in an over-center position with the ear 248 of the lower link 246 seated against the upper link 245. When the connecting link arm 244 is moved to the right of the bell crank 220 to the broken line position as shown in Figure 11, the pivot point 254 which connects the links 244, 245 and 246 together is moved to the right, thus causing the links 245 and 246 to partially collapse. The collapsing movement is limited by stop 248'. This causes the crank arm 146 to be raised, which in turn lifts the fork 144 to raise the gear 136 out of locked engagement with the pin 142 on the agitator shaft 94 (as shown in Figure 9).

From the above it will be understood that when the solenoid 239 is energized and the forked arm 233 is in the position as shown in full lines in Figure 10, the bell crank lever 220 has pulled the connecting link 244 to its furthermost position to the left (as shown by the full lines in Figure 11) which, in turn, means that the crank arm 146 is in its lowermost position. Since the driving gear 136 is in clutched engagement with the agitator shaft 94 when the crank arm 146 is in its lowermost position, it will thus be understood that when the solenoid 239 is energized the gear 136 is in driving connection with the agitator shaft 94, thus causing the agitator to be oscillated. When the solenoid 239 is deenergized, the agitator is disconnected from driving engagement with the gear 136 and is left in its idle position.

Mechanism somewhat similar to the agitator control mechanism is provided for the pump. As shown in Figure 12, a triangular shaped plate member 255 is rigidly secured on the end of the shaft 199 which carries the valve arm 198 and the valve 197. The end of the shaft 199 is preferably flattened and fitted into a complementary hole in the plate 255 in order to prevent any relative rotation between the plate 255 and the shaft 199. A supporting plate 256 is pivotally mounted on a pin 257 carried on the triangular plate 255. The supporting plate 256 is held in place on the pin 257 by a spring 258, a washer 259, and a cotter pin 260 (see Fig. 3).

Bolted to the supporting plate 256 is a casting 261 having a tubular portion 262 which is bored to slidably receive the rod 205. The supporting plate 256 also supports a solenoid unit 263 which is secured to an upper arm 264 thereof. The solenoid unit 263 has a downwardly projecting plunger or armature 265 which is raised upon energization of the solenoid and dropped by gravity upon deenergization of the same. The casting 262 has a boss 266 formed on the under side thereof which carries a control arm 267. The control arm 267 is pivotally mounted on a pin 268 carried by the boss 266. The control arm 267 has two laterally projecting ears 269 and 270 which extend below and above the rod 205, respectively. These laterally projecting ears 269 and 270 correspond to the laterally projecting ears 237 and 236 of the agitator control. A collar 271 is secured on the rod 205 and is arranged to be engaged by the ears 269 and 270.

When the solenoid 263 is energized the control arm 267 is in its uppermost position, with the laterally projecting ear 269 resting against the under side of the rod 205. In this position the casting 262 and support plate 256 have been moved to their left-hand position as shown in Figure 12, and the triangular plate 255 has been rocked to the left, causing the valve shaft 199 to be rotated so that the valve is in its open position as shown by the full line in Figure 13. In this position it will be noted that the triangular plate 255 has its upper point bearing against a pin 272 which acts as a stop for limiting clockwise movement of the plate 255. A coil spring 273 is connected between the pin 272 and an ear 274 on the left-hand corner of the triangular plate 255. This spring acts as an over-center spring to keep the triangular plate 255 in one of its two extreme positions, or in other words to set the valve 197 in either a fully opened or a fully closed position.

When the solenoid 263 is deenergized, the plunger 265 drops down, causing the control arm 267 to be lowered about its pivot point 268. As the control arm 267 falls down, the laterally projecting ear 270 falls either directly against the rod 205 or else against the collar 271. As soon as the collar 271 has reached its extreme left-hand position as viewed in Figure 12, the laterally projecting ear 270 will drop onto the rod 205 if it has not already done so. As the rod 205 moves back to the right due to the rotation of the crank 213, the control arm 267 is carried to the right by the collar 271. Movement of the control arm 267 to the right carries the casting 262 and the supporting plate 256 to the right. Movement of the supporting plate 256 to the right causes the triangular plate 255 to be rocked in a counterclockwise direction as viewed in Figure 12, thus turning the valve shaft 199 to move the valve 197 to a closed position.

Upon again energizing the solenoid 263 the control arm 267 is raised and the collar 271 will engage the laterally projecting ear 269 and move the control arm 267, the casting 262 and the supporting plate 256 to the left as viewed in Figure 12, thus causing the valve 197 to again open.

The drier control mechanism is similar to the agitator control and the pump control mechanism.

Referring now to Figures 3 and 14 it will be noted that the drier control mechanism is mounted on a supporting arm 275 which is rotatably mounted on a pin 276 carried by the base 42. Pivotally mounted on the supporting arm 275 as at 278 is a link plate 277. The link plate 277 is hooked to the crank arm 170 by a bent rod 279. The lower end of the bent rod 279 is threaded and screwed through a threaded hole in crank arm 170 and a jam nut 280 is then screwed on the threaded end of rod 279. The other end of the bent rod 279 has a cotter pin 281 projecting therethrough to retain the link plate 277 thereon.

The lower end of the supporting arm 275 has a laterally projecting ear 282 which is arranged to ride along an arcuate surface 283 of the link plate 277. The laterally projecting ear 282 rests against the lower portion 284 of the link plate 277 in one extreme position which acts as a stop, and bears against a corner 285 of the link plate 277 which acts as a stop in the other extreme position.

A supporting plate 286 is pivotally mounted on a pin 401 on the supporting arm 275. Plate 286 is resiliently retained on the pin 401 by a spring assembly 402. This supporting plate 286 carries a solenoid unit 287 which is bolted thereto as at 288 and also carries a casting 289 which is bolted to the plate as at 290. The casting 289 includes a tubular portion 291 which is longitudinally bored to receive the rod 206. A control arm 292 is pivotally mounted on a boss 293 formed on the under side of the casting 289. The control arm 292 is substantially the same as the control arm of the valve control mechanism and includes a pair of laterally projecting ears 294 and 295 which project above and below the rod 206, respectively. A collar 296 is secured to the rod 206 and is arranged to be engaged by one or the other of the ears 294 and 295. The solenoid unit 287 includes a plunger 297 which is secured by a cotter pin 298 to the control arm 292.

When the solenoid 287 is energized the control arm 292 is in its uppermost position, which means that the collar 296 has moved the control arm 292, the casting 289, the supporting plate 286 and the supporting arm 275 to their right-hand position as viewed in Figure 14. In this position the link plate 277 has raised the control lever 170 which in turn has caused the drive shaft 150 to be placed in clutching engagement with the driving gear 156 of the drier basket transmission unit 72. All of the respective elements in Figures 14 and 15 have been shown in full line position to indicate the relative position of the elements when the perforated basket 67 is being rotated.

When the solenoid unit 287 is deenergized, the control arm 292 drops down and the laterally projecting ear 294 either falls directly onto the rod 206 or onto the collar 296. If the ear 294 falls onto the collar 296 it will only be supported thereby until the collar 296 has reached its lefthand position, at which time the ear 294 will drop directly onto the rod 206. As the rod 206 now moves back to the left the collar 296 will bear against the ear 294 and move the casting 289, the supporting plate 286, and the supporting arm 275 to their extreme left-hand position as shown by the broken lines in Figure 14. In this position the link plate 277 has dropped down and lowered the arm 170. It will be remembered that when arm 170 is lowered the disk 166 bears against the braking surface 165 and separates the clutching surface 158 from the disk 157 on the gear 156. This stops rotation of the perforated basket 67.

The control mechanism for controlling the temperature setting of the temperature mixing valve 39 is a simple manual control. More particularly, as is clearly shown in Figure 3, a link rod 299 extends between an angularly movable finger 300 on the temperature mixing valve 39 and a crank arm 301 which is secured to a vertical shaft 302. The angularly movable finger 300 is secured to a short shaft 303 which projects out of the temperature mixing valve 39 and it will be understood that partial rotation of this short shaft 303 causes a variation in the temperature setting of the mixing valve 39. In other words, movement of the shaft 303 varies the proportion of hot to cold water which is permitted to flow from the mixing valve 39 into the outlet conduit 181. The vertical shaft 302 is supported on a plate 304 carried on the bottom brace bar 305 of the casing. It will be observed that this bottom brace bar 305 in turn is carried by two straps 306 and 307 which extend across the two lower corners of the casing 31. The shaft 302 extends up through the cover 32 and has secured on its upper end a control knob 34 which may be turned to set the temperature mixing valve 39 so as to provide water at the desired temperature in the tub 66.

An angle bar 308 is provided at the opposite end of the casing 31 from the bar 305 and includes end portions 309 which extend around the adjacent corners into engagement with the rear wall of the casing 31. A foot 310 is secured to the center of the angle bar 308 as by a nut 311 and similar feet 310 are secured to the straps 306 and 307 and the brace bar 305 by nuts 312.

Float switch mechanism

The float switch mechanism is shown in Figures 2, 16, 17, 18, 19 and 19A of the drawings. The float switch unit 37 is employed to indicate and electrically control the maximum amount of water contained in the tub 66. The float switch unit 38 is employed to indicate when the tub 66 is empty.

The float switch unit 37 is quite simple in construction and includes a tube 313 which is closed at its lower end by an end plate 314. This tube 313 is mounted and held in place by a strap 315 which is bolted or otherwise suitably secured to the angle iron 46 or other suitable portion of the case 31 as at 315'. The lower end of the tube 313 is in open communication with the tub 66 through a flexible hose 316 which is connected to the tub 66 just below the desired maximum water level in the tub. Mounted within the tube 313 is a float 317 which is carried on a rod 318 which projects up out of the tube 313. A guide pin 319 projects up from the base 314 into a tubular inner shell 320 of the float 317. The inner shell 320 makes a fluid-tight connection at both ends with the float proper 317, in a manner well understood by those skilled in the art.

A plate 321 of insulating material such as fiber board is bolted above the tubes 313 and 333 as at 322, two angle clips 323 being provided for this purpose. The clips as shown are welded or soldered to the side walls of the tubes 313 and 333. A mercury switch 324 is mounted in a cradle 325 which is pivotally mounted on a pin 326 carried in a U-shape support 327 which is bolted to the plate 321 as at 328. The cradle 325 has an integral arm 329 formed thereon into which the float rod 318 is hooked. As may be seen best in Figure 19, the mercury switch 324 is in the form of a glass tube having three depending tube portions which are capped as at 330, 331 and 332 for receiving a female socket member of the lead wires or conductors connected to the switch. It will of course be understood that the metal caps 330, 331 and 332 are electrically connected with the interior of the depending glass tubular portions so as to be in contact with the mercury contained therein.

When the float 317 is in its lowermost position the mercury in the switch 324 places the center conducting cap 331 in contact with the outer conducting cap 330. When the float 317 is in its upper position the mercury in the glass switch 324 places the center conducting cap 331 in electrical contact with the outer conducting cap 332 and disconnects the center conducting cap 331 from the conducting cap 330.

The float switch unit 38 is similar to the float switch unit 37 and comprises a tube 333 which is closed at its lower end by an end plate 334. The tube 333 is similar to the tube 313 but is much longer and extends down to the base of the tub 66. The tubular portion 333 is in open communication with the tub 66 through a flexible hose 335 located at the bottom of the tub. It will thus be understood that any water in the tub 66 will pass into the tubular cylinder 333 and remain at the same level in the tubular portion 333 as in the tub 66. A float 336 is mounted in the tube 333, a guide pin 337 being provided to retain it in proper position. The float 336 is supported on a rod 338 which is carried on the arm 339 of the cradle 340 of a mercury switch 341. The mercury switch 341, as shown in Figure 19A, is similar to the mercury switch 324 with the exception that only two depending closed glass tube portions, terminating in metal caps 350 and 351, are provided. The cradle 340 of the mercury switch 341 is mounted for rocking movement on a pin 342 carried in a U-shaped support 343 bolted to the plate 321 as at 344.

The insulating plate 321 also serves as a terminal block for the two mercury switches 324 and 341. As will presently be more fully understood, five terminal posts 345, 346, 347, 348 and 349 are necessary. The three terminal posts 345, 346 and 347 are electrically connected through flexible pigtail conductors (not shown) to the metal end caps 330, 331 and 332 of the mercury switch 324. The terminal posts 348 and 349 are connected to metal end caps 350 and 351 of the mercury switch 341.

The electrical control circuit

Referring now to Figures 20, 21, 22 and 25, the electrical control circuit will be described.

The various mechanical operations to be performed by the automatic washer function at predetermined times and for predetermined periods over a complete cycle of operations. For this purpose a timer 352 is mounted on a depressed cap 353 of the cover 32. Since the construction of the timer per se forms no part of the present invention it has not been illustrated in detail. It will be understood, however, that any conventional timer may be employed which employs an electric motor 354 which rotates the shaft 355 and which has mounted thereon five cam disks 356 to 360. In the conventional timing mechanism employed in connection with the preferred embodiment of the present invention, the motor 354 rotates the shaft 355 in a step-by-step action at 37½ second intervals. More specifically, the construction of the timing mechanism 352 is such that the shaft 355 is rotated through an angle of five degrees every 37½ seconds.

At the top of the shaft 355 a control knob 35 is provided which includes a central disk 361 which is provided with a D-slot to fit over the end of the shaft in which a flattened portion 362 has been provided. Slidably mounted around the inner disk 361 is an outer ring or knob portion 363. The ring 363 is vertically supported on a flat metal pointer 364 having turned-up ears 365 which extend into recesses 366 in the under side of the ring 363. The flat pointer or support 364 is carried by the inner disk 361 and a washer 367 which is firmly secured to the shaft 355.

As may be seen best in Figure 20, the inner disk 361 has a slot 368 cut out of one edge for the purpose of providing a friction clutch. In this slot is disposed a pin 369 whose diameter is slightly less than the maximum width of the slot but greater than the width of the narrow portion of the slot. It will thus be understood that the shaft 355 may only be rotated in a clockwise direction by the knob or outer ring 363. If the outer ring 363 is rotated in a counterclockwise direction the ring rides free on the inner disk 361 and does not turn the shaft. As will presently be understood, this is necessary to prevent damage to the cam disks 356 to 360, or their associated followers presently to be described. It is also to be understood that the motor 354 rotates or advances the shaft 355 in a clockwise direction only, when viewed from the top.

Turning now to the diagram shown in Figure 22, where the cam disks 356 to 360 of the timer 352 are shown, it will be observed that each cam 356 to 360 has a contact arm 368 to 372, inclusive, each of which arms is equipped with a cam follower 373 to 377, inclusive. Associated with each of the contact arms 368 to 372, inclusive, are stationary contact points 378 to 382, respectively. A contact arm is in engagement with its associated stationary contact point whenever the cam follower of that particular arm is on a low point of the associated cam disk. Whenever the cam follower is on a high point of its cam disk the associated contact arm is out of engagement with its stationary contact point. As shown in Figure 22, cam followers 373, 375 and 377 are on high points of their associated cams 356, 358 and 360. As a result, contact arms 368, 370 and 372 are out of engagement with their associated stationary contact points 378, 280 and 382, respectively. Cam followers 374 and 376 are riding on a low point of their associated cams 357 and 359, and as a result contact arms 369 and 371 are in electrical engagement with their associated stationary contact points 379 and 281.

The shaft 355 of the timer 352 is so mounted that it may be lifted vertically a slight distance without causing disengagement of the cam followers from their associated cam disks. This slight vertical lifting of the shaft 355, however, is so arranged as to lift a contact disk 383 on the shaft 355 out of engagement with two stationary contacts 384 and 385. This is provided in order that the machine may be started at any given point in the cycle of operations.

The particular shape of each cam disk 356 to 360 is clearly shown in Figure 23. This is a bottom view of each cam disk or, in other words, shows the face of the cam disk which may be seen in Figure 22 of the drawings. The cam disk 356 is in the motor control circuit. The cam disk 357 is in the flow control valve circuit. The cam disk 358 is in the pump circuit. The cam disk 359 is in the agitator circuit, while the cam disk 360 is in the drier basket control circuit.

The timer 352 is connected through a terminal block 386 to a power line 387 which supplies electric current at desired voltage to the main operating motor 69 of the washing machine, to the timer motor 354, and to the various electrical control circuits. In order to simplify the description of the control circuit as much as possible, the various control circuits will be traced back from the operating solenoid or other apparatus to the source of power in the order in which their functions are performed.

With the cam disk 359 in the position as shown in Figure 22, the washing machine is ready to proceed through its complete cycle of operations.

The solenoid of the flow control valve 182 is now energized through conductor 388 to one side of the power source 387 and through conductor 389, stationary contact point 379, contact arm 369, conductor 390, contacts 330 and 331 of the mercury switch 324, conductor 391, conductor 392, switch elements 385, 383, 384 and conductor 393, to the other side of the power source.

In view of the fact that the agitator, the timer motor, and the main washer motor are all connected in a control circuit through the top contact 332 of the top float, none of these elements are energized while the tub 66 is being filled with water at desired temperature. For example, it will be observed that even though the contact arm 371 associated with the agitator disk is closed against stationary contact 361, the agitator solenoid is nevertheless not energized for the upper contact 332 is open at this time. Note that to close this circuit upper contact 332 must close for this circuit includes conductor 394, contact arm 371, conductors 395 and 396, upper contact 332 of the float switch 87, and conductors 391, 392 and 393. The other side of the agitator solenoid is directly connected through conductors 397 and 398 to the other side of the power source.

As soon as the tub 66 is filled with water, the float 317 rises, breaking the circuit of the flow control valve and closing the circuit between conductors 396 and 391. As soon as the float 317 rises to open the circuit between conductors 390 and 391, the flow control valve closes, thus shutting off the supply of water to the tub. With the mercury switch 324 tilted so that the circuit is closed between conductors 396 and 391 through upper contact 332, the agitator solenoid is energized, as described above. The float switch 324 must of course, be so designed that contacts 331 and 332 will make when contacts 330 and 331 break. To assure this, the mercury switch contacts slightly overlap.

When upper contact 332 closes, it will be observed that the circuit of the main motor 69 and the circuit of the timer motor 354 are also energized. Thus as soon as main motor 69 starts up, the agitator starts to oscillate. Both of these motors 69 and 354 are connected in shunt with respect to each other. One side of each of these motors 69 and 354 is directly connected to one side of the source of power, 387. The other side of each of the motors 69 and 354 is connected through conductor 396, mercury switch 324, conductors 391, 392, and 393, to the other side of the source of power. It will be observed that the cam disk 357 associated with the flow control valve is cut so that the contact arm 369 is in engagement with stationary contact 379 for a slightly lesser time than the agitator control is closed. This assures the proper amount of water in the tub in case any is lost for any reason and causes the top float 317 to drop down.

After the shaft 355 has been rotated to a position which causes the followers 374 and 376 to be lifted up to raise the contact arms 369 and 371, the cam follower 375 drops down onto a low place on its associated disk 358 and closes the contact arm 370 against the contact point 380 of the pump control circuit. The pump solenoid is now energized through conductors 397 and 388 to one side of the power source 387 and through conductor 396, contact arm 370, conductor 395, contact arm 368, and conductors 392 and 393 to the other side of the source of power. It will be noted that the contact arm 368 of the motor control was closed simultaneously with the closing of the contact arm 370. Energization of the solenoid 263 causes the valve 197 to be opened in the manner previously described, and water is withdrawn from the tub 66 by the pump 71.

Approximately two minutes after the pump has started, the cam follower 377 drops down onto a low point on the cam disk 360, causing the contact arm 372 to close against stationary contact 382. This causes energization of the drier or extractor solenoid 287. The energization circuit of the drier or extractor solenoid 287 is connected to the power line on one side through conductor 399, mercury switch 361, conductors 397 and 388; while solenoid 287 is connected on the other side through conductor 400, contact arm 372, conductor 395, contact arm 368, and conductors 392 and 393 to the other side of the power source 387. It will be remembered that upon energization of the drier or extractor solenoid 287 the perforated basket 67 is driven through the transmission and clutch unit 72 from the motor 69.

At the end of a predetermined period of time, the cam disk 358 of the pump control circuit, the cam disk 360 of the drier or extractor control circuit, and the cam disk 356 of the motor control circuit, all cause their associated contact arms 370, 372 and 368, respectively, to be raised, thus opening their respective circuits. Simultaneously, the cam follower 374 drops down onto a low point again on the cam disk 357, thus closing the flow control valve circuit to supply water again to the tub 66 for the purpose of rinsing the clothes. Also, the cam follower 376 drops down onto a low point on its associated cam disk 359 to cause the contact arm 371 to close against the contact point 381. Since the contact arm 368 has been raised, and since the top float is still in a down position, the main motor 69 and the timer motor 354 are deenergized until the tub is completely filled with water. When the tub has been filled the float 317 has reached its upper position, thus causing the mercury switch to close the circuit between contact points 332 and 331 in the mercury switch 324. At this time the two motors 69 and 354 are again energized and the agitator solenoid 239 is also energized, thus placing the agitator into operation.

After the agitator has been in operation for a predetermined length of time, the agitator control circuit is opened by raising the contact arm 371 and simultaneously the pump circuit and the motor control circuit are closed through contact arms 370 and 368. A short period later, and while the pump and motor control arms 370 and 368 are still closed, the drier control arm 372 is closed, thus placing the drier into operation.

The cam disks 356 to 360 shown in Figures 22 and 23 have been cut to provide cycles of operation as indicated by the chart in Figure 24. This chart and the cutting of the cam disks 356 to 360 have been based on experience as to the length of times desirable for each operation of the automatic washing machine. The washing cycle is preferably about twenty minutes long, as is represented by the first heavy black line in the chart, which indicates the time in which the agitator is oscillating. The third black line in the chart indicates the length of time that the pump is in operation for withdrawing water from the tub 66. It will be observed that the pump starts approximately two minutes before the perforated basket 67 starts to rotate. This is to enable the great bulk of the water in the tub 66 to be completely withdrawn before any whirling of the basket 67 is begun. The basket 67 whirls for approximately 7½ minutes, during which time the pump is extracting any water in the bottom of the tub 66 which is drawn out of the clothes or other articles in the basket by centrifugal action. After the clothes are dried they are then rinsed by refilling the tub 66 with clean water and placing the agitator 68 again into operation. The rinse cycle is approximately 4½ minutes. The clothes are then dried for the second time by first withdrawing the water from the tub and then whirling the basket 67.

Since it is quite obvious that some clothes require a great deal less washing than others, it has been found desirable to arrange the construction in such a manner that the wash cycle may be shortened to a period less than twenty minutes. This can be done by simply raising the control member 35, rotating it in a clockwise direction, and setting it down at some desired indicated point of time on the indicator or scale 400 disposed below the pointer 364 in the bottom of the depressed cup 353. The length of time of the washing cycle is calibrated on this indicator 400 in minutes. The drying and rinsing cycles cannot be shortened except by interrupting the normally continuous cycle of operations. This has been found undesirable, since it takes a certain definite amount of time to remove all soap or other alkaline solutions out of the clothes, and for that reason the ordinary user of the machine should not, preferably, be given an opportunity to shorten the rinse cycle. It has also been found unnecessary to provide an adjustment in the drying time.

Summary of operation

The complete operation of the automatic washing machine which has been hereinbefore described as a preferred embodiment of the present invention may be briefly summarized as follows:

Clothes, or any other fabric material to be washed, may be thrown into the basket 67 after the cover 33 in the casing 31 has been raised. A small amount of soap, preferably in the form of flakes or small granulated particles, is then sprinkled on top of the clothes or other articles. The temperature control knob 34 is now set for the desired water temperature at which the clothes are to be washed. The main timer control knob 35 is raised and turned in a clockwise direction as looking down upon it, until the pointer 364 is opposite the point on the dial 406, which indicates the desired length of time of the wash cycle. Assume for example that the operator desires to have the wash cycle last for 15 minutes. The knob 35 in this case is raised and rotated in a clockwise direction until the pointer 364 is opposite the numeral 15 on the calibrated scale, and then lowered. The machine is now connected to the source of power 387 and thereafter the remaining operations all take place automatically, without any further attention from the operator.

Upon energization of the control circuit, the flow control valve 182 is opened, and water at desired temperature flows through the mixing valve 39, conduit 181, valve 182 and conduit 183 into the tub 66. When the tub fills up to a point where the float 317 is raised, the mercury switch 324 opens the energization circuit of the flow control valve 182 and closes the energization circuit of the agitator. The agitator now continues in operation for fifteen minutes. If at any time water should, for any reason, be splashed out or lost from the tub 66, the flow control valve 182 will again be opened to replace the lost water, the agitator being temporarily stopped during the water replacement interval.

After the agitator has been in operation for fifteen minutes the agitator circuit is opened at the contact 381 and the pump valve solenoid 263 is energized, causing an opening of the valve 197. This causes the pump 71 to withdraw or drain the water from the tub 66. Three impulses after the pump valve has been opened, the extractor or drier basket circuit is closed at contact 382. If, but only if, the float switch 341 is also closed, the perforated basket which carries the clothes will be rotated at high speed. This causes a centrifugal drying of the clothes or other articles in the basket 67. It will be remembered that all the time that the basket 67 is whirling, the pump is in direct operative connection with the tub 66. This causes all of the water thrown out by centrifugal action to be drained immediately from the tub 66.

The basket 67 continues to whirl for approximately 7 minutes. At the end of this time the pump valve 197 is closed and the basket drive is disconnected from the motor 69. Simultaneously, the flow control valve 182 is again opened and the tub 66 is refilled with clean water for the purpose of rinsing the clothes or other articles. As soon as the tub 66 is filled and the float 317 rises, the agitator control circuit is energized and the agitator continues to operate for approximately five minutes. At the end of this rinse cycle of five minutes the agitator circuit is deenergized and the pump valve 197 is opened to enable the pump 71 to drain the water from the tub 66. As soon as all of the water has been drained from the tub 66, the extractor or drier basket circuit is energized, thus causing the basket 67 to be connected in driving relation with the motor 69. The basket continues to whirl for approximately seven minutes, at the end of which time its circuit is deenergized and the cycle of operation is complete.

At the end of this last drying cycle it will be noted, from inspection of the shape of the cam disks as shown in Fig. 23, and from Fig. 22, that at this point of time all of the cam disks have a high point, which means that all of the circuits are deenergized. For this reason it is obvious that it is unnecessary for the operator to be present at the end of the complete cycle of operations, since the machine and control circuit is automatically completely deenergized.

Because of the particular type of floating mounting employed, it has been found that vibration in the outer casing is negligible. While the floating mounting per se greatly reduces vibration, it has been observed that the substantion elimination of vibration is largely due to the orientation of the elements with respect to the suspension rods 53 and to increasing the mass of the base 42.

*Modifications of floating base suspension*

Two modifications of the floating base suspension are shown in Figures 25 and 26. The modifications are similar to the view showing the suspension in Figure 7.

In the first modified form of suspension as shown in Figure 25 cables 401 are employed in place of the suspension rods 53. These cables 401 are preferably three in number and have their ends secured in cross plates 402 at the top and 403 at the bottom. The cross plates 402 of each cable are bolted as at 404 to the stationary supporting frame portions 405. The lower plates 403 are bolted as at 406 to the ears 60 of the base or casting 42. The ends of the multi-strand cables 401 are preferably anchored in collars 407.

It has been found that when the base or casting 42 is supported on multi-strand cables that a particularly effective type of floating suspension is obtained since the base has greater freedom of movement laterally of itself than it has to move up and down vertically. Due to the fact that a whirling unbalanced load in the basket 67 tends to cause vibration in a horizontal plane more than in a vertical plane, it will at once be appreciated by those skilled in the art that this particular form of floating suspension is particularly advantageous for the present type of equipment.

In Figure 26 of the drawings we have illustrated a third form of floating base suspension wherein heavy coil springs 408 are employed to suspend the base or casting 42. Plugs 409 having appropriate spiral grooves therein are threaded into the ends of the coil springs 408 both at the top and at the bottom. These plugs 409 have a threaded stud portion 410 which extend through holes in the upper frame member portion 411 and the lower anchoring strap 412 and are secured thereto by nuts 413. The lower anchoring strap 412 is secured to the ears 60 of the base or casting 42 in a manner previously described.

In addition to the suspension springs 408 in the form of the invention shown in Figure 26 a set of anchoring springs 414 are also employed. The lower springs 414 have plug members 415 in each end which are similar to the plug members 409 and which are secured to anchoring straps 416 and 417 by nuts 418. The anchoring strap 416 is secured to the ears 60 of the base or casting 42 while the anchoring straps 417 are secured to stationary frame portions 419. The anchoring springs 414 in conjunction with the suspension springs 408 tend to dampen lateral vibration of the floating assembly. The springs 408 and 414 are capable of being loaded to a greater extent than the maximum possible unit loading of the springs by the floating assembly.

While we have shown and described particular embodiments of our invention it will, of course, be understood that we do not wish to be limited thereto, since many modifications may be made, and we, therefore, contemplate by the appended claims to cover all such modifications as fall within the true spirit and scope of our invention.

We claim as our invention:

1. In a washing machine, a member to be driven, means for driving said member, a reciprocating member, pivotally mounted means connecting said driving means with said reciprocating member, said pivotally mounted connecting means continually actuating said reciprocating member whenever said driving means is operating, clutch means movable to a position to couple selectively said member to be driven in driving connection with said driving means, and control means engageable with said reciprocating member for moving said clutch means to said position to couple said member to be driven to said driving means.

2. In a washing machine, an agitator, a centrifugal basket drier, tub means housing said agitator and said drier, a motor for driving said agitator and said drier, a pair of reciprocating members, means connecting said motor to said reciprocating members to continually and rapidly reciprocate the same whenever said motor is operating, clutch means for said agitator and said drier, respectively, each movable to a position to selectively couple said agitator and said drier independently of each other in driving connection with said motor, and control means selectively engageable with one of said reciprocating members for moving one of said clutch means to its motor coupling position.

3. In a washing machine, a tub, an agitator in said tub, means for oscillating said agitator, a reciprocating member, pivotally mounted means connecting said oscillating means with said reciprocating member, mechanical clutch means for connecting said oscillating means to said agitator, and mechanical control means directly engageable with said reciprocating member to move said clutch means to connect said oscillating means to said agitator.

4. In a washing machine, a tub, a perforated basket, means for rotating said basket, a reciprocating member, pivotally mounted means connecting said rotating means with said reciprocating member, mechanical clutch means for connecting said rotating means to said perforated basket, and mechanical control means engageable with said reciprocating member to move said clutch means to connect said perforated basket to said rotating means.

5. In a washing machine, a member to be driven, a motor for driving said member to be driven, a reciprocating member, means connecting said motor to said reciprocating member to continually reciprocate the same whenever said motor is operating, mechanical clutch means movable to a position to selectively couple said member to be driven in driving connection with said motor, mechanical control means engageable with said reciprocating member for moving said clutch means to said position to couple said driven member to said motor, and electric control means for moving said mechanical control means into engagement with said reciprocating member.

6. A control mechanism comprising a reciprocating rod having a collar thereon, means to reciprocate said rod, a support in which said rod is slidably mounted, a member whose position is to be controlled shiftably mounted on said support for movement in a direction substantially parallel to the longitudinal axis of said rod, a control arm pivotally mounted on said member having a portion thereon arranged to be engaged by said collar to shift said member, and control means for moving said control arm to position said portion in the path of movement of said collar.

7. A control mechanism comprising a reciprocating rod having a collar thereon, means to reciprocate said rod, a support in which said rod is slidably mounted, a member whose position is to be controlled shiftably mounted on said support for movement in a direction substantially parallel to the longitudinal axis of said rod, and a control arm pivotally mounted on said member having a laterally projecting ear, and control means for moving said control arm to position said laterally projecting ear in the path of movement of said collar, whereby said member whose position is to be controlled is shifted by the movement of said reciprocating rod in one direction.

8. A control mechanism comprising a reciprocating rod having a collar thereon, means to reciprocate said rod, a support in which said reciprocating rod is operatively mounted, a member whose position is to be controlled shiftably mounted on said support for movement in a direction substantially parallel to the longitudinal axis of said rod, and a control arm pivotally mounted on said member having a pair of laterally projecting ears spaced apart in a direction longitudinally of the axis of said rod a distance greater than the axial width of said collar, said control arm being movable to position first one of said ears and then the other of said ears in the path of movement of said collar, whereby said member may be shifted between two predetermined positions.

9. In a washing machine, a control mechanism comprising a plurality of elongated members, means for reciprocating said members, a plurality of members to be controlled, and means for selectively coupling one of said members to be controlled to one of said elongated members during a forward stroke only thereof, and additional means for coupling the same member to be controlled to said same elongated member during a rearward stroke of said elongated member, thereby to return said one member to be controlled to its original position.

10. In a washing machine, a control mechanism comprising a supporting structure, a crank rotatably mounted on said supporting structure, a plurality of rods connected to said crank and spread out in fan shape therefrom, said rods being supported in a position to be reciprocated by said crank, a plurality of control levers pivotally mounted on said supporting structure, and means for selectively coupling said levers to said rods to move said levers from one limiting position to another as the rods are reciprocated.

11. In a washing machine, a control mechanism comprising a supporting structure, a crank rotatably mounted on said supporting structure, a plurality of rods connected to said crank and spread out in fan shape therefrom, said rods being supported for reciprocation by said crank, a plurality of control levers pivotally mounted on said supporting structure, means for selectively coupling said levers to said rods to move said levers from a first position to a second position, and means for coupling a lever to its associated rod to return said lever to its first position.

12. In a washing machine, a control mechanism comprising a supporting structure, a crank rotatably mounted on said supporting structure, a plurality of rods connected to said crank and supported to be reciprocated thereby, a plurality of levers to be controlled pivotally mounted on said supporting structure, a plurality of coupling members joined to said levers to be controlled and slidable along said rods, each of said rods having an abutment portion thereon, and each of said coupling members having a control finger arranged to be moved into the path of said abutment portion, whereby said coupling member and said lever to be controlled are moved when the control finger thereof lies in the path of reciprocation of said abutment portion.

13. In a washing machine, a control mechanism comprising a supporting structure, a crank rotatably mounted on said supporting structure, a plurality of rods connected to said crank and reciprocated thereby, means supporting said rods for reciprocation on said supporting structure, a plurality of members whose positions are to be shifted intermittently back and forth between two points, and means for selectively causing said members to be moved between said points by placing a portion of each of said members in the path of movement of a portion of its associated rod.

14. A control mechanism comprising a supporting structure, a crank rotatably mounted on said supporting structure, a rod pivotally connected at one end to said crank and arranged to be reciprocated thereby, a supporting link pivotally mounted on said supporting structure, a member whose position is to be controlled, a second link hinged to said first link and to said member to be controlled, said links forming a toggle between said supporting structure and said member to be controlled, the axis of the pivot point of said first link arm on said supporting structure and of the pivot point of said second link on said member to be controlled being substantially at right angles to the direction of extension of said rod, said rod being slidably supported on said supporting member, a rod-engaging arm hinged to said supporting member and arranged to be angularly shifted in a plane substantially parallel to said rod, said rod-engaging arm having laterally projecting ears disposed on opposite sides of said rod, said ears being spaced longitudinally along the rod with respect to each other, a flange on said rod having an axial dimension less than the axial spacing between said ears, said rod-engaging arm being movable to alternately place first one and then the other of said ears in the path of movement of said flange, and means for controlling the movement of said rod-engaging arm.

15. A control mechanism comprising a supporting structure, a crank rotatably mounted on said supporting structure, a rod pivotally connected at one end to said crank and arranged to be reciprocated thereby, a supporting link pivotally mounted on said supporting structure, a member whose position is to be controlled, a second link hinged to said first link and to said member to be controlled, said links forming a toggle between said supporting structure and said member to be controlled, the axis of the pivot point of said first link arm on said supporting structure and of the pivot point of said second link on said member to be controlled being substantially at right angles to the direction of extension of said rod, said rod being slidably supported on said supporting member, a rod-engaging arm hinged to said supporting member and arranged to be angularly shifted in a plane substantially parallel to said rod, said rod-engaging arm having laterally projecting ears disposed on opposite sides of said rod, said ears being spaced longitudinally along the rod with respect to each other, a flange on said rod having an axial dimension less than the axial spacing between said ears, said rod-engaging arm being normally biased to position one of said ears in the path of movement of said flange, an electrically operated solenoid mounted on said rod-supporting member and having a magnetically movable plunger hinged to said rod-engaging arm, said rod-engaging arm being movable upon energization of said solenoid to position the other of said ears in the path of movement of said flange.

16. A control mechanism comprising a base, a rod, means mounted on said base for reciprocating said rod, a link arm pivotally mounted on said support, a supporting arm pivotally mounted on said link arm, said rod being slidably carried by said supporting arm, a control arm pivotally mounted on said supporting arm and having laterally projecting ears disposed on opposite sides of said rod, a shoulder on said rod arranged to engage one of said ears when such ear is moved into the path of movement of said shoulder, means mounted on said supporting arm for moving said control arm to a position where one of said ears is engaged by said shoulder, whereby said supporting arm, said control arm and said means are shifted by said rod to one extreme position of its movement.

17. A control mechanism comprising a base, an eccentric rotatably mounted on said base, a rod, means connecting one end of said rod to said eccentric, a link arm pivotally mounted on said support, a supporting plate pivoted to said link arm, a casting having a bore extending therethrough through which said rod projects, said casting being mounted on and secured to said supporting plate, a control arm pivotally mounted on said casting and having laterally projecting ears extending on opposite sides of said rod, an electric solenoid mounted on said supporting frame and having an armature pivotally connected to said control arm for moving one of said ears into a position closely adjacent said rod, a shoulder on said rod arranged to engage said ears to move said casting, said supporting plate, and said solenoid to one or the other of two extreme positions.

18. A control mechanism comprising a supporting structure, a crank rotatably mounted on said supporting structure, a rod pivotally connected at one end to said crank and arranged for reciprocation upon rotation of said crank, a supporting link pivotally mounted on said supporting structure, a member whose position is to be controlled, a second link hinged to said first link and to said member to be controlled, a rod supporting member hinged to said first link, said rod being slidably supported on said supporting member, a rod-engaging arm hinged to said supporting member and having projecting portions disposed on opposite sides of said rod, said projecting portions being spaced longitudinally along the rod with respect to each other, a flange on said rod having an axial dimension less than the axial spacing between said portions, said rod-engaging arm being movable to alternately place first one and then the other of said portions in the path of movement of said flange, and means for controlling the movement of said rod-engaging arm.

19. A control mechanism comprising a supporting structure, a shaft mounted on said supporting structure whose angular position is to be controlled, a triangular plate secured on said shaft near its center, a supporting member hinged at one corner of said triangular plate, a reciprocating rod slidably supported by said supporting member, said rod being reciprocable in a plane substantially parallel to the plane of movement of said triangular plate, means for reciprocating said rod, a projecting portion on said rod, a rod-engaging finger pivotally mounted on said supporting member and having a portion thereof shaped to be engaged by said projecting portion on said rod, and means for moving said finger to position said finger portion in the path of movement of said projecting rod portion, whereby said supporting member is shifted in a direction longitudinally of the rod and said triangular plate is angularly shifted with said shaft about the axis of said shaft.

20. A control mechanism comprising a supporting structure, a shaft mounted on said supporting structure whose angular position is to be controlled, a triangular plate secured on said shaft near its center, a supporting member hinged to one corner of said triangular plate, a stop on said supporting structure in the path of rotation of said plate and engageable by a second corner of said plate to limit the angular movement thereof about the axis of said shaft, an over-center spring extending between the third corner of said plate and said stop, a reciprocating rod slidably supported by said supporting member, said rod being reciprocable in a plane substantially parallel to the plane of movement of said triangular plate, means for reciprocating said rod, said rod having a projecting portion thereon, a rod-engaging finger pivotally mounted on said supporting member and having a portion thereof shaped to be engaged by said projecting portion on said rod, and means for moving said finger to position said finger portion in the path of movement of said projecting rod portion, whereby said supporting member is shifted in a direction longitudinally of the rod and said triangular plate is angularly shifted with said shaft about the axis of said shaft.

21. In a washing, rinsing and drying machine, a member to be driven and to perform a part of the washing, rinsing and drying operations, means for driving said member, means for coupling said member to said driving means and interdependent and interrelated cooperating control means for effecting coupling and uncoupling movement of said coupling means, one of said control means being electrically operated for a predetermined timed cycle during which one of the washing, rinsing and drying operations is to be performed and another of said control means having a continuous mechanical movement whenever said driving means is operating which only becomes effective in bringing about actuation of said coupling means upon operation of said electrically operated control means.

PETER EDUARD GELDHOF.
LUTHER RINGER.